United States Patent
Cossairt et al.

(10) Patent No.: US 8,356,905 B2
(45) Date of Patent: Jan. 22, 2013

(54) OPTICALLY ENHANCED IMAGE SEQUENCES

(75) Inventors: Oliver S. Cossairt, New York, NY (US); Thomas J. Purtell, II, Belmont, CA (US); Samuel L. Hill, Somerville, MA (US)

(73) Assignee: Parellel Consulting Limited Liability Company, Dover, DE (US)

( * ) Notice: Subject to any disclaimer, the term of this patent is extended or adjusted under 35 U.S.C. 154(b) by 1736 days.

(21) Appl. No.: 11/614,548

(22) Filed: Dec. 21, 2006

(65) Prior Publication Data

US 2008/0266468 A1 Oct. 30, 2008

Related U.S. Application Data

(60) Provisional application No. 60/791,277, filed on Apr. 11, 2006, provisional application No. 60/752,316, filed on Dec. 21, 2005.

(51) Int. Cl.
*G03B 21/14* (2006.01)
(52) U.S. Cl. .......................... 353/97; 353/30
(58) Field of Classification Search ............ 353/30, 353/31, 34, 37, 46, 50, 51, 94, 97; 349/5, 349/7, 8, 9; 348/740
See application file for complete search history.

(56) References Cited

U.S. PATENT DOCUMENTS

| | | | |
|---|---|---|---|
| 725,567 A | 4/1903 | Ives | |
| 1,128,979 A | 2/1915 | Hess | |
| 4,662,746 A | 5/1987 | Hornbeck | |
| 5,410,345 A | 4/1995 | Eichenlaub | |
| 5,663,831 A | 9/1997 | Mashitani et al. | |
| 5,689,283 A | 11/1997 | Shirochi | |
| 5,755,632 A | 5/1998 | Eddy | |
| 5,808,797 A | 9/1998 | Bloom et al. | |
| 6,184,969 B1 | 2/2001 | Fergason | |
| 6,219,017 B1 | 4/2001 | Shimada et al. | |
| 6,575,576 B1 | 6/2003 | Ciacci et al. | |
| 6,657,603 B1 * | 12/2003 | Demetrescu et al. | 345/32 |
| 6,963,319 B2 | 11/2005 | Pate et al. | |
| 6,971,748 B2 * | 12/2005 | Cho et al. | 353/46 |
| 7,021,466 B2 * | 4/2006 | Kuske et al. | 206/494 |

(Continued)

FOREIGN PATENT DOCUMENTS

EP 1387205 A1 2/2004

(Continued)

OTHER PUBLICATIONS http://www.popsci.com/posci/bown/2004/homeentertainment/article/0,22221,767810,00... Dec. 4, 2006.

(Continued)

*Primary Examiner* — William C Dowling
(74) *Attorney, Agent, or Firm* — Turocy & Watson, LLP

(57) ABSTRACT

Enhanced image sequences are provided by a high resolution imaging system (HRIS) for generating an enhanced image, where the system includes a device for outputting an image sequence including a plurality of K source images, each source image including a plurality of pixels; and a projector for projecting, within a period of integration, each of the source images to an optical filter, the filter adapted for providing pixels of each source image as sub-pixels of pixels in the enhanced image. The enhanced images may be two-dimensional or three-dimensional. A method and computer program product are provided for generating enhanced images, as well as techniques for fabrication of the HRIS.

34 Claims, 26 Drawing Sheets

U.S. PATENT DOCUMENTS

| | | | |
|---|---|---|---|
| 7,109,981 | B2 | 9/2006 | Damera-Venkata et al. |
| 7,113,231 | B2 * | 9/2006 | Conner et al. ............ 349/5 |
| 7,182,463 | B2 * | 2/2007 | Conner et al. ............ 353/31 |
| 7,267,442 | B2 * | 9/2007 | Childers et al. ............ 353/31 |
| 7,322,700 | B2 * | 1/2008 | Miyagaki et al. ............ 353/31 |
| 7,425,074 | B2 * | 9/2008 | Kang et al. ............ 353/46 |
| 2002/0030887 | A1 | 3/2002 | Hamagishi et al. |
| 2003/0020809 | A1 | 1/2003 | Gibbon et al. |
| 2003/0222980 | A1 | 12/2003 | Miyagaki et al. |
| 2004/0263932 | A1 * | 12/2004 | Sakai ............ 359/196 |
| 2005/0025388 | A1 | 2/2005 | Damera-Venkata et al. |
| 2005/0093894 | A1 | 5/2005 | Tretter et al. |
| 2006/0114423 | A1 * | 6/2006 | Maeda et al. ............ 353/94 |

FOREIGN PATENT DOCUMENTS

| | | | |
|---|---|---|---|
| JP | | 04113308 A | 4/1992 |

OTHER PUBLICATIONS

Said, Amir. "Analysis of Systems for Superimposing Projected Images". Media Technologies Laboratory, HP Laboratories Palo Alto HPL-2006-129, Oct. 5, 2006.

Sung Cheol Park, Min Kyu Park, and Moon Gi Kang, "Super-resolution image reconstruction: a technical overview," IEEE Signal Processing Magazine, May 2003, pp. 21-36.

Will Allen and Robert Ulichney, "Wobulation: Doubling the Addressed Resolution of Projection Displays," SID 05 Digest, paper 47.4, pp. 1514-1517.

International Search Report, Application No. PCT/US2006/048984, Date Mailed Aug. 28, 2007.

* cited by examiner

Fig. 16A
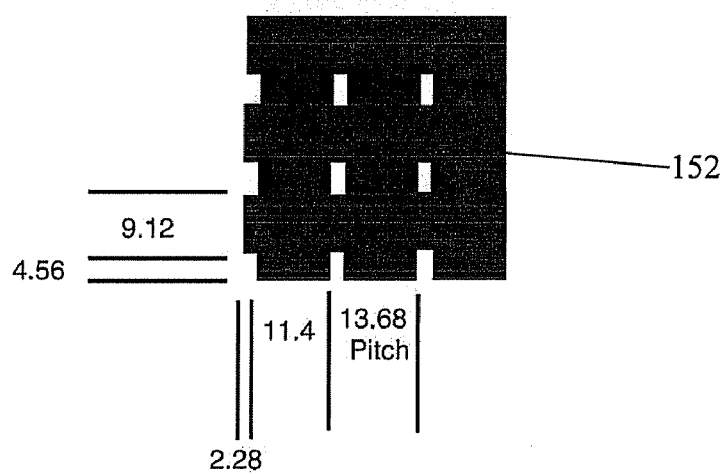
6X3 PIXEL
* Units in um
* Array (white squares) is 1096 x 804
* Pattern Size: 15 mm x 11 mm
* Drawing ONLY represents a 3 x 3 grid for clarification
Fig. 16B
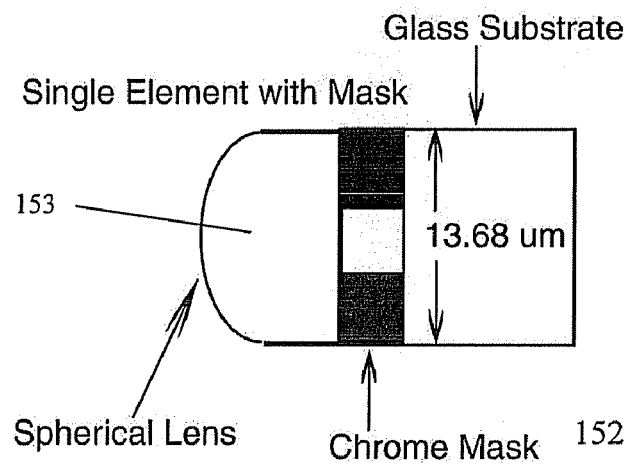
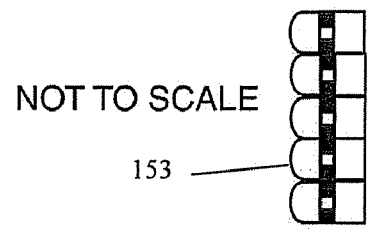
NOT TO SCALE
153
1096 x 804 Array
(15 x 11 mm)

Instantaneous footprint
of single source pixel - 100

Low spatial duty cycle instantaneous footprint of single source pixel due to fly's-eye lens array and source barrier

280

OPTICALLY ENHANCED IMAGE SEQUENCES

CROSS REFERENCE TO RELATED APPLICATIONS

This application is filed under 37 CFR 1.53(b) and claims the benefit of an earlier filing date under 35 U.S.C. §119(e) to U.S. Provisional Patent Applications No. 60/791,277 filed Apr. 11, 2006 and No. 60/752,316 filed Dec. 21, 2005, the entire disclosures of which are incorporated by reference herein in their entirety.

STATEMENT REGARDING FEDERALLY SPONSORED RESEARCH

This invention was made with United States Government support under cooperative agreement number 70NANB3H3028 awarded by the National Institute of Standards and Technology (NIST). The United States Government has certain rights in the invention.

BACKGROUND OF THE INVENTION

1. Field of the Invention

The invention disclosed herein relates to enhancement of digital images and, in particular, to techniques for projecting enhanced resolution digital images.

2. Description of the Related Art

It is well known that there is a demand for image displays that provide high quality images. The performance of image displays is typically improved with an increase in a number of pixels. Currently, a pixel count for a standard display is about 1280 pixels×about 1024 pixels, whereas a display having a high pixel count includes about 5,120 pixels×4,096 pixels.

Typically, a number of complex components provide for generation of images using image displays. For example, the electro-optical modulators (EOM) that enable electronic image sources—especially high pixel count modulators—are difficult to fabricate and costly. Exemplary EOM include liquid crystal display (LCD) panels and micro-electromechanical system (MEMS) components. Problems associated with these technologies include low yield due to "dead" pixels as well as manufacturing challenges associated with precise placement of spacers and maintaining various film and layer thicknesses. Some electro-optical image modulators have a surplus of frame rate compared to the rate required to present a high-quality image within the integration time of the human visual system.

One example of an EOM that has an excess frame rate includes the MEMS devices described in U.S. Pat. No. 4,662,746, "Spatial Light Modulator and Method." This patent discloses an electrostatically deflectable beam spatial light modulator with the beam composed of two layers of aluminum alloy and the hinge connecting the beam to the remainder of the alloy formed in only one of the two layers; this provides a thick stiff beam and a thin compliant hinge. The alloy is on a spacer made of photoresist which in turn is on a semiconductor substrate. The substrate contains addressing circuitry. For convenience, this device is referred to as a "digital mirror device" (DMD).

Another example of an EOM that has an excess frame rate is disclosed in U.S. Pat. No. 5,808,797 "Method and Apparatus for Modulating a light Beam." This patent discloses a modulator for modulating incident rays of light, the modulator having a plurality of equally spaced apart elements, each of which includes a light reflective planar surface. The elements are arranged parallel to each other with their light reflective surfaces parallel to each other. The modulator includes means for supporting elements in relation to one another and means for moving particular ones of the elements relative to others so that the moved elements transit between a first configuration wherein the modulator acts to reflect the incident rays of light as a plane mirror, and a second configuration wherein the modulator diffracts the light reflected therefrom. In operation, the light reflective surfaces of the elements remain parallel to each other in both the first and the second configurations. The perpendicular spacing between the reflective surfaces of respective elements is equal to $m/4$ times the wavelength of the incident rays of light, wherein m=an even whole number or zero when the elements are in the first configuration and m=an odd whole number when the elements are in the second configuration.

An example of a resolution enhancement system using controlled illumination of excess frame rate light modulators is described in U.S. Pat. No. "Stroboscopic Illumination for Video Displays." This patent discloses a flat panel autostereoscopic display having full resolution equal to the number of pixels in the two-dimensional light valve array, which serves to generate images. The display is achieved by incorporating an illumination system which makes use of stroboscopic light sources or continuously lit light sources in combination with electro-optical shutter means. The lighting system when used in conjunction with a 2-D flat panel display, achieves image resolution exceeding several times the pixel resolution of the light valve array.

Further examples of increasing resolution using sub-frame translation are described in U.S. Pat. No. 6,963,319 and U.S. Patent Application No. 2005/0025388A1. U.S. Pat. No. 6,963,319, entitled "Image display system and method" discloses a method of displaying an image that includes receiving image data for the image; buffering the image data for the image, including creating a frame of the image; defining a first sub-frame and at least a second sub-frame for the frame of the image; and displaying the first sub-frame and the second sub-frame, including synchronizing shifting a displayed image of the second sub-frame with displaying the second sub-frame. Patent Application No. 2005/0025388A1, entitled "Generating and displaying spatially offset sub-frames" discloses a method of displaying an image with a display device includes receiving image data for the image. A first sub-frame and a second sub-frame are generated based on combinations of pixel values from the image data. The method includes alternating between displaying the first sub-frame in a first position and displaying the second sub-frame in a second position spatially offset from the first position.

Unfortunately, the techniques disclosed do not provide desired benefits. For example, these techniques do not result in a fieldwise increase of resolution. Moreover, the techniques introduce unwanted blurring of the input images. Accordingly, improvement to technologies for resolution enhancement systems is warranted.

What are needed are techniques that provide for enhanced resolution for projection displays. Preferably, the techniques make use of existing components and require few additions to existing projection display designs.

BRIEF SUMMARY OF THE INVENTION

Disclosed is a high resolution imaging system (HRIS) for generating an enhanced image, the system including: a device for outputting an image sequence including a plurality of K source images, each source image including a plurality of pixels; and a projector for projecting, within a period of integration, each of the source images to an optical filter, the filter adapted for providing pixels of each source image as sub-pixels of pixels in the enhanced image.

Also disclosed is a method for producing an enhanced image, the enhanced image including a plurality of pixels, the method including: outputting an image sequence including a plurality of source images, each of the source images including a plurality of pixels; within a period of integration, projecting each source image of the image sequence, and filtering each source image to produce sub-pixels of the pixels in the enhanced image.

Further, provided herein is a computer program product including machine readable instructions stored on machine readable media for providing an enhanced image, the instructions including: outputting an image sequence including a plurality of source images, each source image including a plurality of pixels; projecting a first source image; filtering the first source image to provide a plurality of sub-pixels on a first location of a surface for pixels of the enhanced image; projecting a next source image and filtering the next source image to provide a plurality of sub-pixels in a next location for pixels of the enhanced image until each of the source images has been projected on the surface within a period of visual integration.

In addition, a high-resolution imaging system is disclosed and includes: means for receiving an image sequence including a plurality of source images, each source image including a plurality of pixels; and projecting means for projecting within a period of integration each of the source images to filtering means, the filtering means for providing pixels of each source image as sub-pixels of pixels in the enhanced image.

A method for fabricating a high resolution imaging system (HRIS) for generating an enhanced image is also disclosed and provides for selecting components for receiving an image sequence including a plurality of source images, each source image including a plurality of pixels; and for projecting within a period of integration each of the source images to an optical filter, the filter including a plurality of windows for providing pixels of each source image as sub-pixels of pixels in the enhanced image; and assembling the components.

Further provided is a high resolution imaging system (HRIS) for generating a three-dimensional (3D) enhanced image, that includes: a device for outputting an image sequence including a plurality of source images, each source image including a plurality of pixels; and a projector for projecting, within a period of integration, each of the source images to an optical filter and a spatial multiplexing element, the filter adapted for providing pixels of each source image as sub-pixels of pixels in the 3D enhanced image.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 16A and FIG. 16B, collectively referred to herein as FIG. 16, illustrate aspects of embodiments for an optical barrier and a microlens array (respectively);

DETAILED DESCRIPTION OF THE INVENTION

Disclosed are techniques for providing enhanced multi-pixel images. Among other things, the techniques make use of many components presently used for generation of multi-pixel images.

As discussed herein, an "image" is a visual presentation as interpreted by an observer. Each image is typically provided by an image sequence having a plurality of source images. The providing occurs within an integration time for the human eye, $T_{eye}$. Each source image is a two-dimensional array formed by a plurality of pixels.

In prior art systems, conventional images are generated at a certain rate. That is, a plurality of pixels associated with the conventional image are provided for a conventional period of time, $T_{prior\ art}$, prior to being replaced by the plurality of pixels associated with a second conventional image. Accordingly, the term "frame rate" refers to the rate in which successive images are produced. In typical prior art systems, components have capabilities to produce conventional images at a frame rate that is faster than warranted by the technology making use of them.

Figure 1:
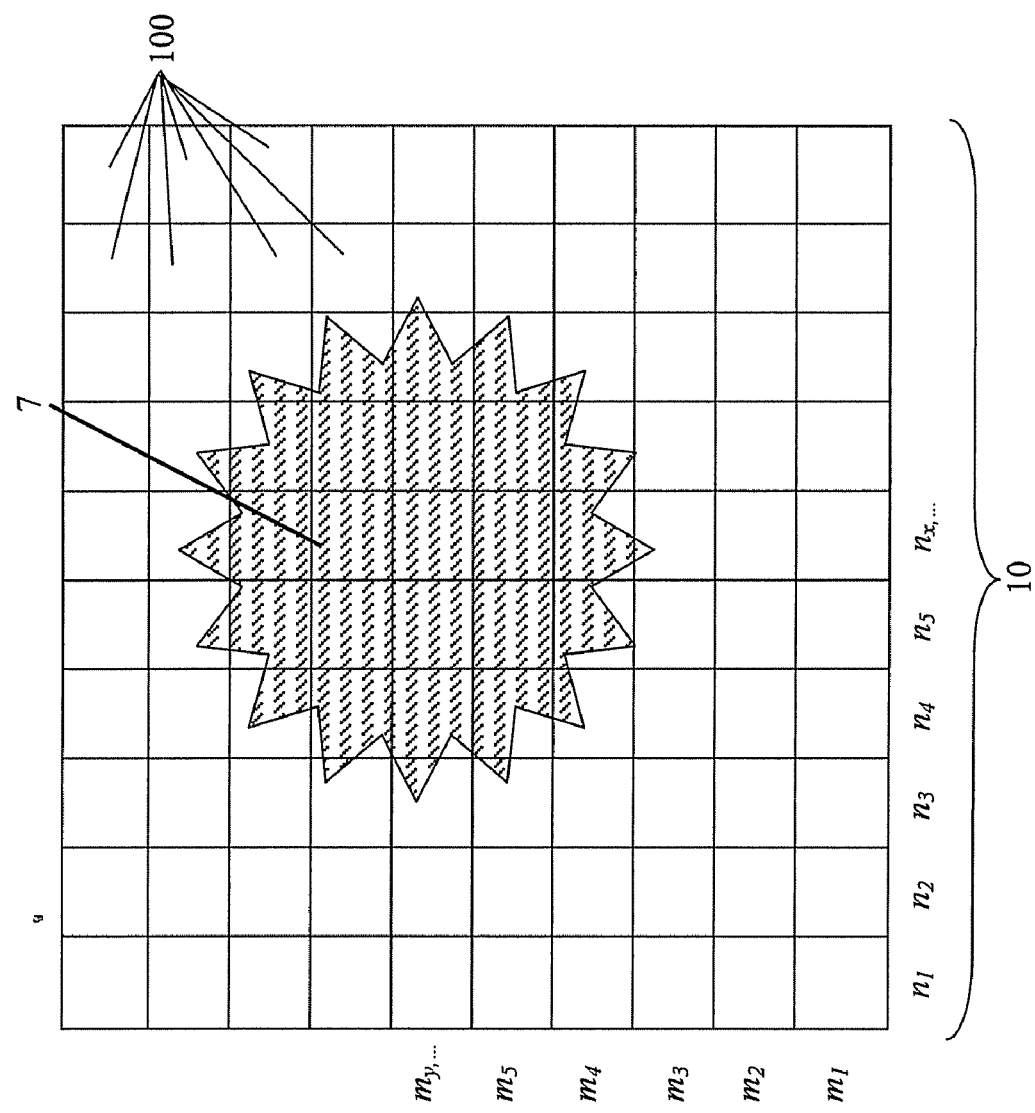
FIG. 1 depicts a frame for forming an image, wherein the frame includes a plurality of pixels.

Referring now to FIG. 1, there are shown aspects of an exemplary and conventional image 7. In this example, the conventional image 7 includes a star as well as a surrounding area. The illustration shows only one source image 10 (as FIG. 1 is merely a still image). The source image 10 includes a plurality of pixels 100. For convention, the conventional image 7 (and therefore, for FIG. 1, the source image 10) includes N pixels in a first direction and M pixels in a second direction. The conventional image 7 (prior art) is two-dimensional (2D).

As shown in FIG. 1, some of the pixels 100 may include only a portion of aspects of the conventional image 7. It should be recognized that the representation provided in FIG. 1 is merely illustrative and not entirely accurate. That is, in some prior art, each pixel is capable of only providing a single representation (such as an entirely shaded area, or an entirely non-shaded area), and can not provide multiple representations as shown (for example, a shaded area, a non-shaded area and an edge within the pixel). Thus, aside from depicting relationships of pixels 100 within a source image 10, this diagram illustrates a need for increased resolution (i.e., increases to the number of pixels to appropriately depict an image 7).

Figure 2A:
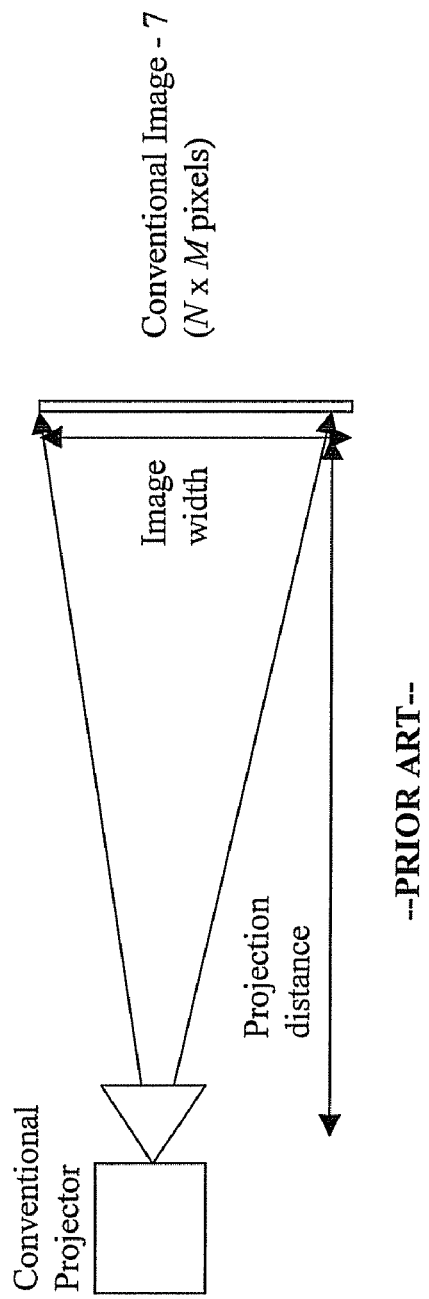
FIG. 2A and FIG. 2B, collectively referred to herein as FIG. 2, illustrates a conventional projector and a modified projector as a high resolution imaging system (HRIS) for providing an enhanced image.
Figure 2B:
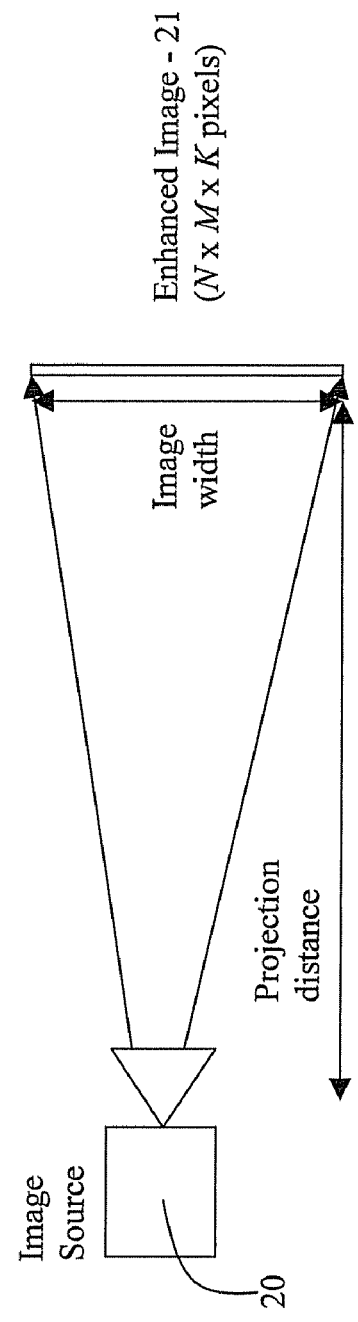

FIG. 2A and FIG. 2B, collectively referred to as FIG. 2, compares a conventional high frame rate projector with an image source 20 (also referred to herein as a "projector" 20, a High Resolution Imaging System (HRIS) 20, and by other similar terms). In FIG. 2A, the conventional projector produces the conventional image 7 having a pixel count of N pixels×M pixels. In FIG. 2B, the image source 20 produces an enhanced image 21. The enhanced image 21 has a pixel count of N pixels×M pixels×K pixels. The image source 20 includes a resolution enhancement system as discussed throughout this disclosure. The resolution enhancement system increases the pixel count for the enhanced image 21 by a multiplicative factor of K over the conventional image 7.

With reference to the image source 20 of the teachings herein, "excess frame rate," and other similar terms, make reference to capabilities of components (generally unused in the prior art) to produce images at a rate that is faster than that of visual perception (the integration time of the human eye, $T_{eye}$). Aspects of an embodiment of the image source 20 are illustrated in FIG. 3.

Figure 3:
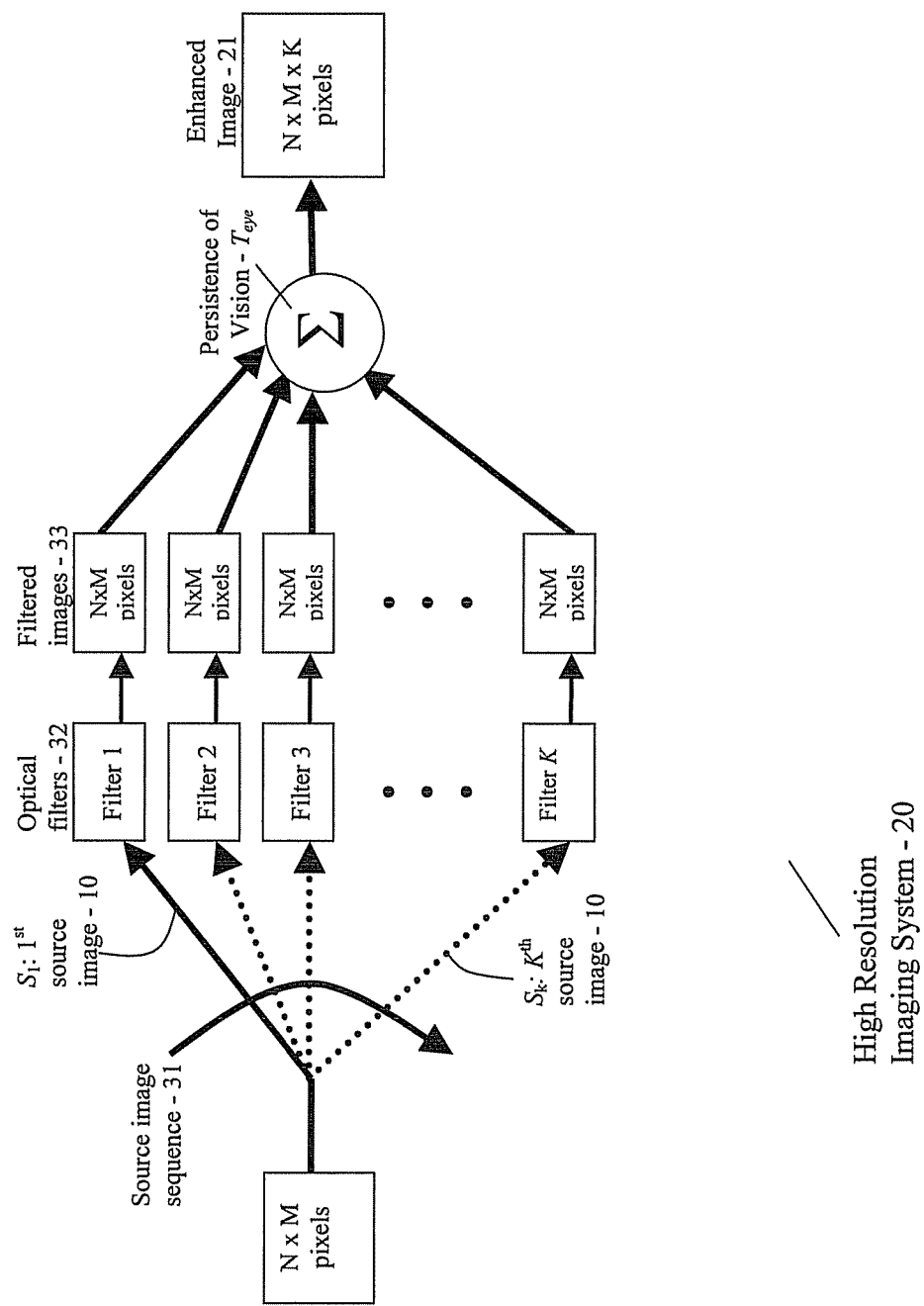
FIG. 3 illustrates aspects of resolution enhancement disclosed herein.

Referring to FIG. 3, there are shown aspects of a time-multiplexing principle used in the disclosed resolution enhancement technique. The image source 20 provides an image sequence 31 having a plurality of source images 10 (a total image number for the entire plurality being represented by K). Each source image 10 within the image sequence 31 includes image information having N pixels×M pixels. The image sequence 31 is produced over a period of time $T_{EI}$. The value of the period of time $T_{EI}$ is chosen to be smaller than the integration time of the human eye, $T_{eye}$ (less than about 50 ms). Thus, appropriate image sources are capable of generating the plurality of source images 10 within the period of time $T_{EI}$. Normally, each one of the plurality of source images 10 is processed by a respective optical filter 32 from a plurality of optical filters 32. Thus, a plurality of filtered images 33 is produced within the period of time $T_{EI}$. Each of the plurality of filtered images 33 is aligned (i.e., "superimposed") with the remaining filtered images 33.

Each optical filter 32 from the plurality of optical filters 32 can be, but is not necessarily, different from other respective optical filters 32.

Normally, the optical filters 32 are designed such that when all of the filtered images 33 are superimposed, the result is the enhanced image 21 having N pixels×M pixels×K pixels. When the period of time T is chosen properly, the observer perceives a two-dimensional (2D) enhanced image 21 having a high pixel count.

The teachings herein provide for use of a conventional high-bandwidth projection system (for example, capable of producing 10,000 images per second with 1,024 pixel×768 pixel resolution). In typical embodiments, the teachings provide for enhanced images 21 that enjoy a resolution multiplication factor of about 25 (that is, the total image number K is 25). Having the resolution multiplication factor of 25 effectively increases resolution for the conventional image from 1024 pixels×768 pixels to 5120 pixels×3840 pixels. This increase provides for the enhanced image 21.

Figure 4:
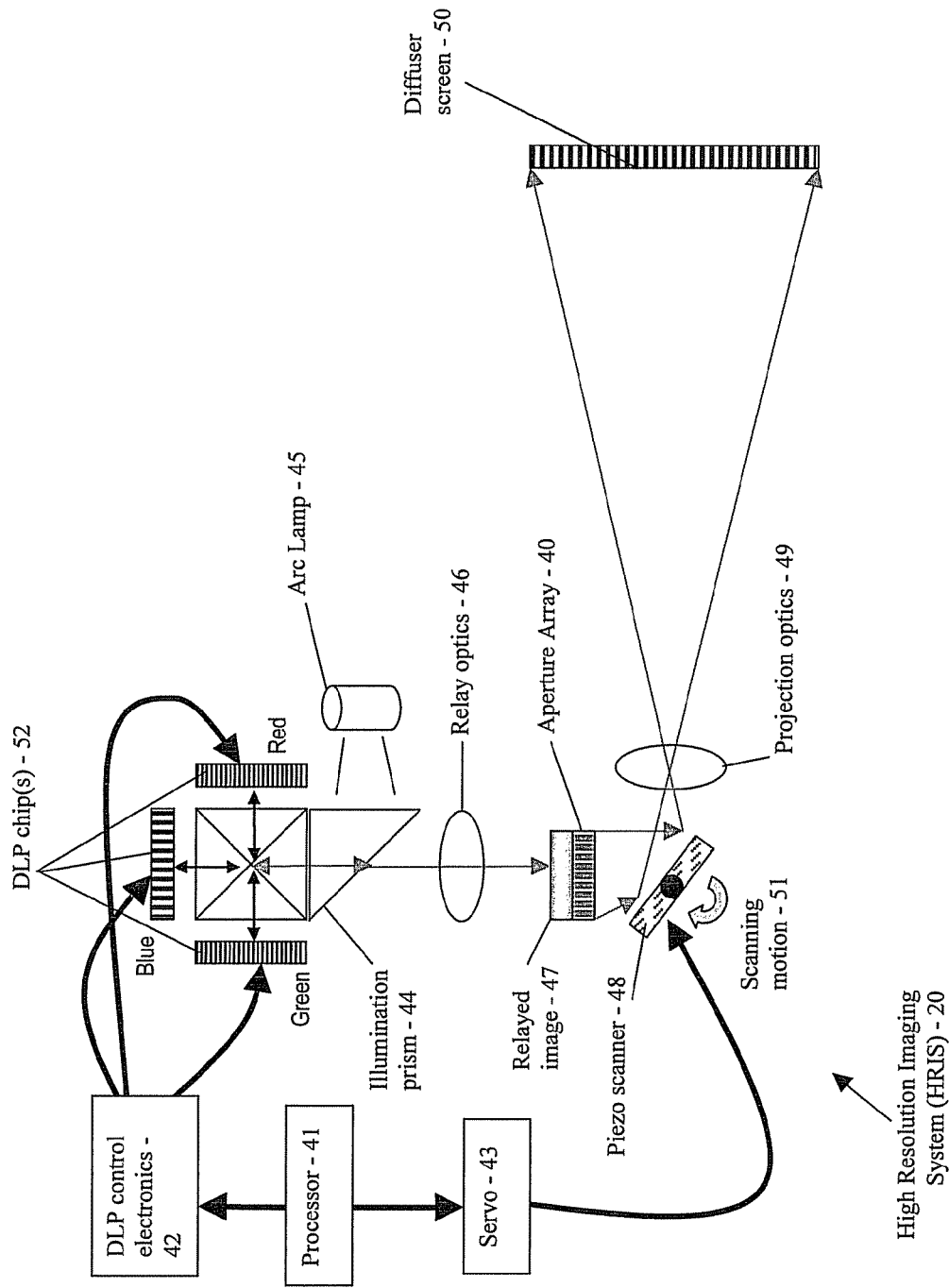
FIG. 4 depicts aspects of an exemplary embodiment of the high resolution imaging system (HRIS)

Typical embodiments of the invention make use of an aperture array at a source image plane in conjunction with a tip/tilt scanner to create the enhanced image 21. Reference may be had to FIG. 4.

In FIG. 4, there are shown aspects of an exemplary High Resolution Imaging System (HRIS) 20 for producing enhanced images 21. In FIG. 4, a processor 41 (such as a personal computer (PC)) is coupled to digital light processor (DLP) control electronics 42 and at least one servo 43. The processor 41 and the DLP electronics 42 control DLP chips 52. The DLP chips 52 (typically, one for each of red, green and blue) provide a plurality of high-bandwidth digital projectors. The at least one servo 43 provides for articulation of a scanner 48 and the attendant generation of a scanning motion 51.

An exemplary high-bandwidth DLP system includes a DMD™ micro-electromechanical (MEMS) micromirror array, such as those provided by Texas Instruments of Plano, Tex. Use of DMD high-bandwidth digital projectors provide for generation of at least 10,000 XGA (1024×768) frames per second. Considering the total number images K for the typical embodiment (i.e., K=25), and the integration time of the human eye, the level of performance of these DLP chips 52 is adequate. This is determined by Eq. (1):

$$T_{EI} = \left(\frac{K}{FR}\right) \leq T_{eye}; \tag{1}$$

where
  $T_{EI}$ represents time for generation of enhanced image;
  K represents the total number of source images in the plurality;
  FR represents frame rate for the digital projector; and
  $T_{eye}$ represents integration time for the human eye.

Applying Eq. (1), the time for generation of the enhanced image, $T_{EI}$, is about 0.25 milliseconds (ms). Using these DLP chips 52, the time for generation of the enhanced image, $T_{EI}$, is about one half of the integration period for the human eye. Increasing the color depth of the enhanced image 21 requires projecting a multiple of K source images, thereby using more of the DLP frame rate surplus.

In this embodiment, three 0.7" XGA (1024×768 pixel) DMDs are illuminated using standard components, such as an arc lamp 45 (for example, a mercury arc illumination stage), and illumination prisms 44 (i.e., color separating and color combining prisms) to generate an independently modulated R-G-B image source. The processor 41 and DLP electronics 42 direct the DLP chips 52 to create a full source image sequence 31 (having 25 images) once every 25 ms, or at a frequency of 40 Hz (¹⁄25 ms). Therefore, in this embodiment, the source image sequence 31 includes 1,000 instantaneous source images per second ((25 images/sequence)×(40 sequences/s)).

An exemplary embodiment of the DLP electronics 42 includes components from Tyrex Services of Austin, Tex. These exemplary DLP electronics 42 provide for control of the DLP chips 52 at the appropriate rates. A traditional personal computer may be used as the processor 41 to generate drive signals for a piezo-electric scanner 48 and to provide synchronization signals for the DLP electronics 42. In one embodiment, drive signals for the scanner 48 provide for manipulation of a servo 43, such as a servo motor provided by Physik Instrumente of Germany. In this embodiment, a diffuser screen 50 (also referred to as a "projection screen") has a 40° circular diffuser profile. An exemplary diffuser screen 50 includes a diffuser screen provided by Physical Optics Corp. of Torrence, Calif.

A combination of components and methods provide for superimposing images from each of the DLP chips 52. In this embodiment, relay optics 46 provide each superimposed image to an aperture array 40 as a relayed image 47. Exemplary relay optics 46 include a projection lens such as an ULTRA-MC 742.01 having a 25 mm focal length, provided by ISCO Precision Optics GMBH of Göttingen, Germany.

Typically, aspects of the aperture array 40 match aspects of each source image 10. For example, there is a correlation in the number and arrangement of pixels 100 for the source image 10 with the apertures provided by the aperture array 40. The size of each aperture is smaller than the size of the corresponding pixel in the source image 10. The separation between adjacent apertures is identical to the pixel pitch in each source image 10. An exemplary aperture array 40 is provided by RPC Photonics, Inc. of Rochester, N.Y.

As noted above, each source image 10 of the image sequence 31 is filtered to provide a filtered image 33. An $i^{th}$ filtered image 33 is designated as filtered image $F_i$. Each optical filter 32 (denoted as $OF_i$, where i represents an index for the image sequence 31) results from the combined operation of the aperture array 40 and an instantaneous state of the scanner 48. Typically, each filtered image 33 is provided to the diffuser screen 50 by projection optics 49.

Figure 5C:
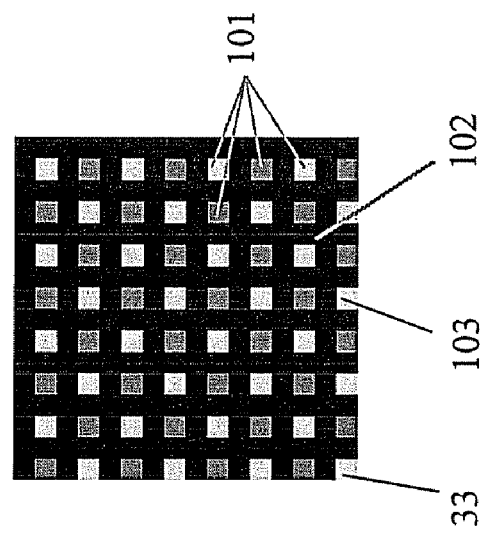
FIG. 5 depicts an source image, an aperture array and a corresponding filtered image.
Figure 5B:
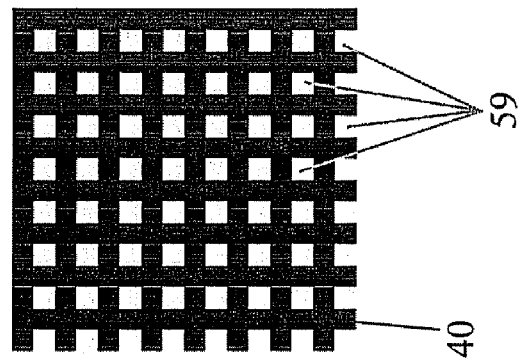
Figure 5A:
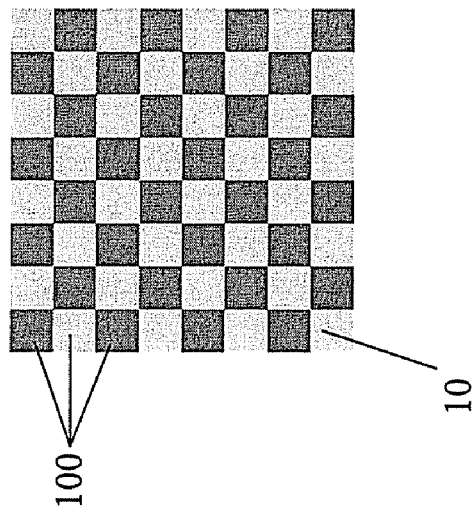

FIG. 5 illustrates an input source image 10 (FIG. 5A), a schematic representation of the aperture array 40 (FIG. 5B), and the result of masking the input source image 10 with the aperture array 40 (FIG. 5C).

Figure 6:
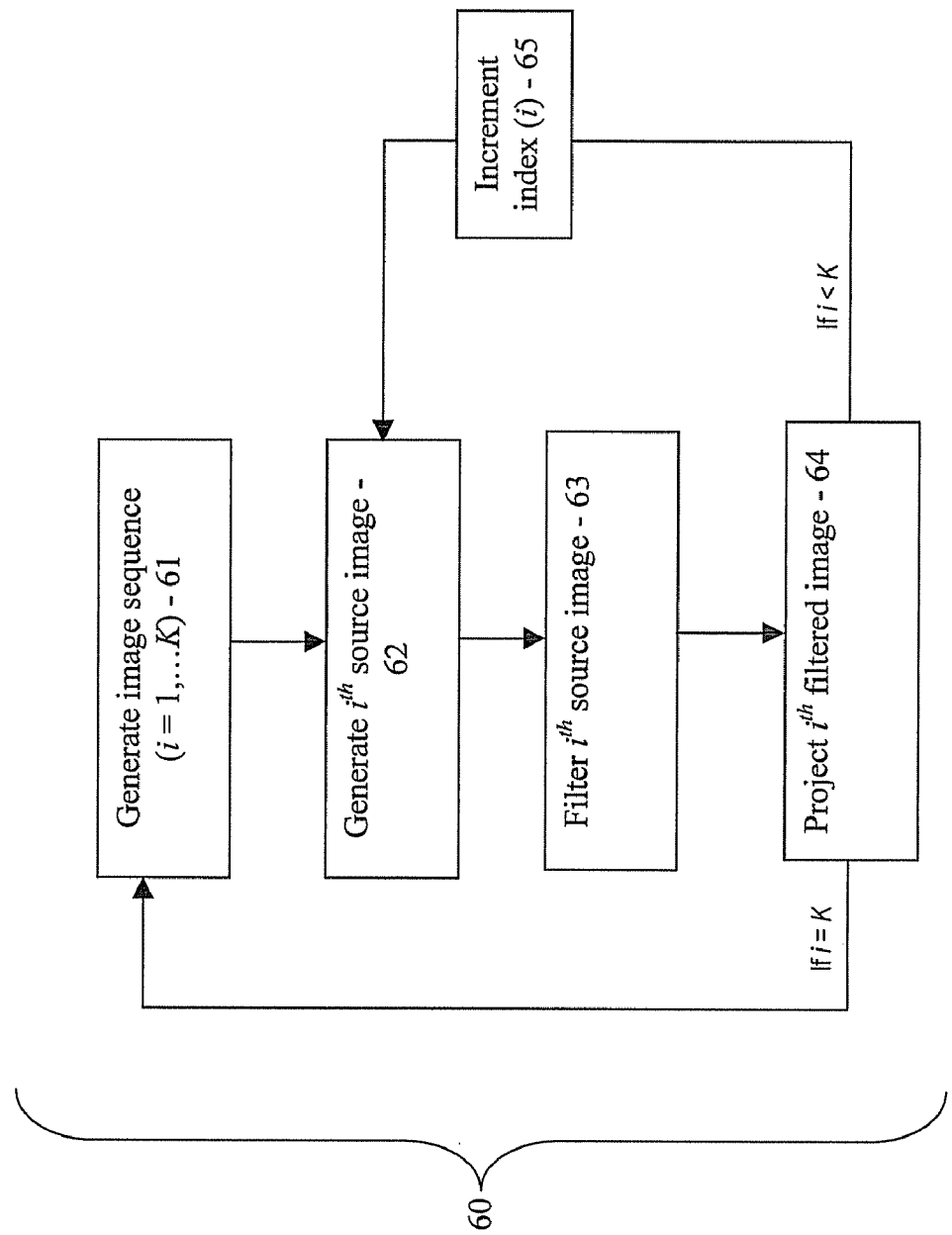
FIG. 6 depicts an exemplary method for generating the enhanced image.

Referring now to FIG. 6, in combination with FIGS. 3 and 4, a method for generating the enhanced image 60 is provided. In FIG. 6, the method 60 provides for an ongoing stream of imagery. As a first step, the method 60 calls for generating the image sequence 61 (of 1 through K source images). A second step calls for generating an $i^{th}$ source image 62, while in a third step filtering of the $i^{th}$ source image 63 occurs. In a fourth step, projecting of the $i^{th}$ filtered image 64 is completed. The method 60 then tests to determine if projecting of the image sequence 31 is complete. If the entire image sequence 31 has been projected, then the method 60 repeats the first step and generates another image sequence 31. If source images 10 for projection remain in the image sequence 31, then the method increments an index i for the image sequence 31 and proceeds with generating the next source image 10.

Filtering the $i^{th}$ source image 63 and projecting the $i^{th}$ filtered image 64 includes providing slight shifts in a location for each source image 10 on the diffuser screen 50. Accordingly, each source image 10 is oriented as a $K^{th}$ portion of the combined image (i.e., the enhanced image 21).

Consider now, aspects of the method 60 in an exemplary embodiment. At a first time step (having a duration of $T_{Ef}/K$), a first source image $S_1$ is filtered by optical filter $OF_1$. Portions of the first source image $S_1$ are masked by the aperture array 40, and the tip/tilt scanner 48 is directed to provide the first filtered image $F_1$ on the output image plane 50. This forms the first portion of a tiled high-resolution enhanced image 21.

In the second time step (also having a duration of $T_{Ef}/K$), the second source image $S_2$ is filtered by optical filter $OF_2$. That is, portions of the second source image $S_2$ are masked by the aperture array 40, and the tip/tilt scanner 48 is directed to point in a slightly different direction (such as slightly to the right). This provides the second filtered image $F_2$ in a slightly different but overlapping region on the output image plane 50. This forms the second portion of the tiled resolution-enhanced output image. This process continues through all K source images and then the process repeats.

The rapid movement of the scanner 48 enables, in part, the continuing process of providing multiple filtered images $F_i$. Accordingly, "filtering" is used to provide the enhanced image 21, and "scanning" is but one aspect of filtering. Various aspects of filtering are disclosed herein, with some embodiments providing certain advantages. For example, efficient scanning patterns provides for production of the enhanced image 21 in a shorter period of time T. As the period of time T is decreased, additional source images 10 may be added to each image sequence 31. Increasing the number K of source images 10 in the image sequence 31 may be relied upon to increase the resolution or the color depth of the enhanced image 21.

Accordingly, one skilled in the art will recognize that the HRIS 20 disclosed herein takes advantage of time-multiplexing techniques. Thus, improved resolution for the enhanced image 21 may be realized by use of techniques that provide for filtering additional source images 10 for each image sequence 31. Thus, incorporation of time saving steps, such as implementation of faster electronics as well as efficient scanning techniques may provide increased resolution in the enhanced image 21.

Refer again to FIG. 5 for more detail. In the exemplary embodiment provided in FIG. 5A, each pixel 100 on the DLP chip 52 is a 13.68 µm×13.68 µm square. The aperture array 40, depicted in FIG. 5B, includes a grid of M×N=1024×768 square apertures 59. In this embodiment, each aperature 59 is $1/K^{th}$ the area of a pixel 100 on the DLP chip 52. That is, the area of each aperture 59 is $(1/\sqrt{K}*13.68 \mu m) \times (1/\sqrt{K}*13.68 \mu m)$. An offset (distance for center-to-center separation) of each aperture 59 in the grid of the aperture array 40 is equivalent an offset (distance for center-to-center separation) for each pixel 100 in the pixel grid in the DLP chip 52.

As shown in FIG. 5, the source image 10 is masked by the aperture array 40. This creates the filtered image 33, as pictured in FIG. 5C. Notice that the filtered image 33 is made up of small sub-pixels 101. The sub-pixels 101 are separated by a zero-information-bearing area 102, shown in FIG. 5C as a black region. For convention, a sub-image 103 includes only the sub-pixels 101, and is a discrete region denoted as $P_{x,y}$. In many regards, the sub-image 103 and the filtered image 33 are generally equivalent.

It should be noted that sub-pixels 101 are also referred to as "windowed pixels," "demagnified pixels" and by other similar terms. In general, the terminology used for the sub-pixels 101 provides insight into techniques for formation of the respective sub-pixel 101. Accordingly, use of the terminology "sub-pixel," "windowed pixel," and "demagnified pixel" is merely illustrative of aspects of the teachings herein and non-limiting of the invention.

In the embodiment depicted, each sub-image 103 is a square with the same dimensions. The total area occupied by each sub-image 103 is smaller than the original image. However, the area of the sub-image 103, in combination with the zero-information-bearing area 102, is about identical to the area of the original source image 10.

Figure 7:
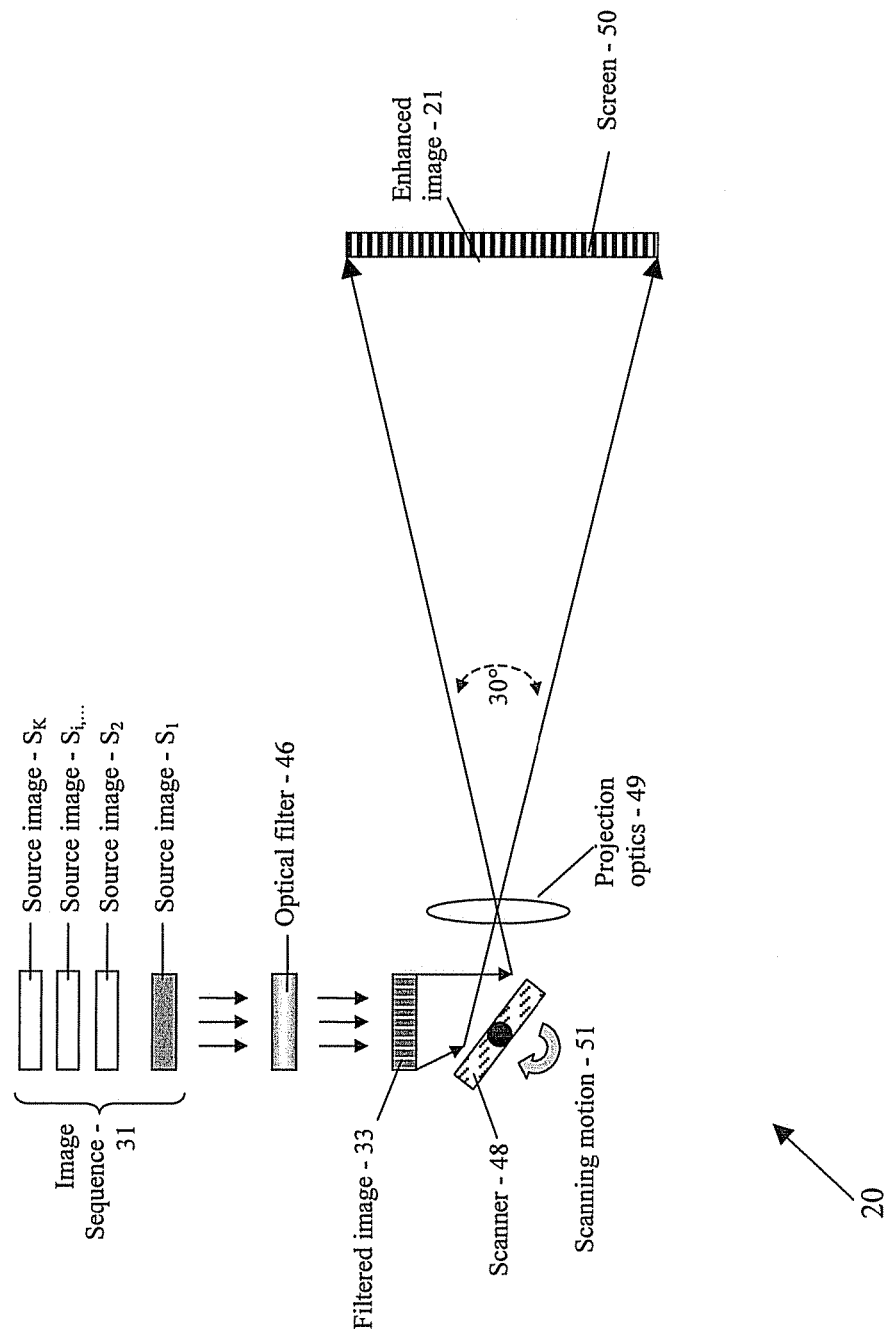
FIG. 7 depicts aspects of another embodiment of the HRIS.

Refer now to FIG. 7, which is a simplified depiction of the embodiment of FIG. 4. In comparison with the embodiment provided in FIG. 4, the filtering by the aperture array 40 is not unique for the source images 10 of the image sequence 31. That is, there is one aperture array 40, without regard for the magnitude of K. The angular scanner 48 further processes the input image sequence 31 by displaying each source image 10 presented onto the screen 50. The optical modulator (in this case, the aperture array 40), angular scanner 48, and projection lens 49 together produce the desired optical filter sequence.

In typical embodiments, the tip/tilt scanner 48 is synchronized to the series of K source images 10. The scanner 48 uses a mirror supported by piezoelectric elements that are electrically controlled to produce changes in tip and tilt of the mirror. A manufacturer of a typical scanner 48 is Physik Instrumente of Germany. The scanner 48 is placed in between the optical filter (in this embodiment, the aperture array 40) and the projection lens 49. As discussed herein, activating the scanner 48 to provide scanning motion 51 causes projected images (i.e., filtered images 33) to translate slightly. Translation is performed in conjunction with display of sequential source images 10.

Typically, the properties of the angular scanner 48 are determined by the DLP chips 52 and projection optics 49 together. A projection angle for the projection optics 49 determines the angular extent of a pixel 100. In an example case, the horizontal projection angle is 30°. The angular extent of a pixel is therefore 30°/1024=0.029°=0.5 mrad. For K=25, the angular scanner 48 is used with the aperture array 48 to create a 5×5 grid of displacements having a grid spacing of 0.2×0.5 mrad=0.1 mrad. This results in displacement of each projected filtered image 33 such that the filtered image sequence 31 produces a tiled output enhanced image 21.

Figure 8:
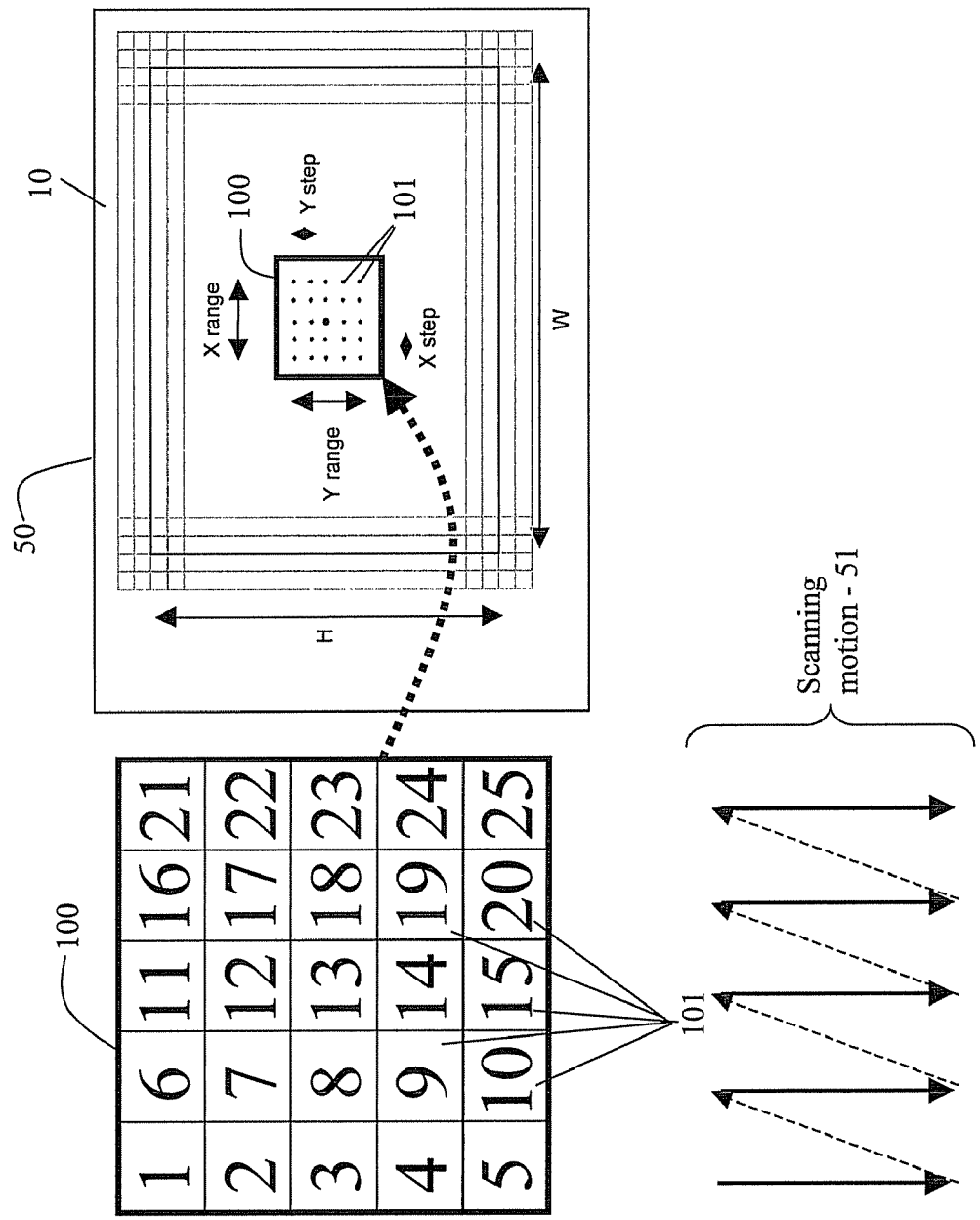
FIG. 8 depicts aspects of scanning motion and relationships of sub-pixels.

An example of tiled output is provided in FIG. 8. In FIG. 8, a single pixel 100 is shown on the left. The pixel 100 includes a series of twenty five (25) sub-pixels 101. In this example, the sub-pixels 101 are arranged in a 5×5 grid, where a first sub-pixel 101 appears in the top-left corner of the pixel 100. The next sub-pixel 101 appears directly below the first sub-pixel 101, and so on. Accordingly, production of the pixel 100 involves scanning motion 51 that is down, right and up, down, etc, . . . until the image sequence 31 is completed.

Figure 9:
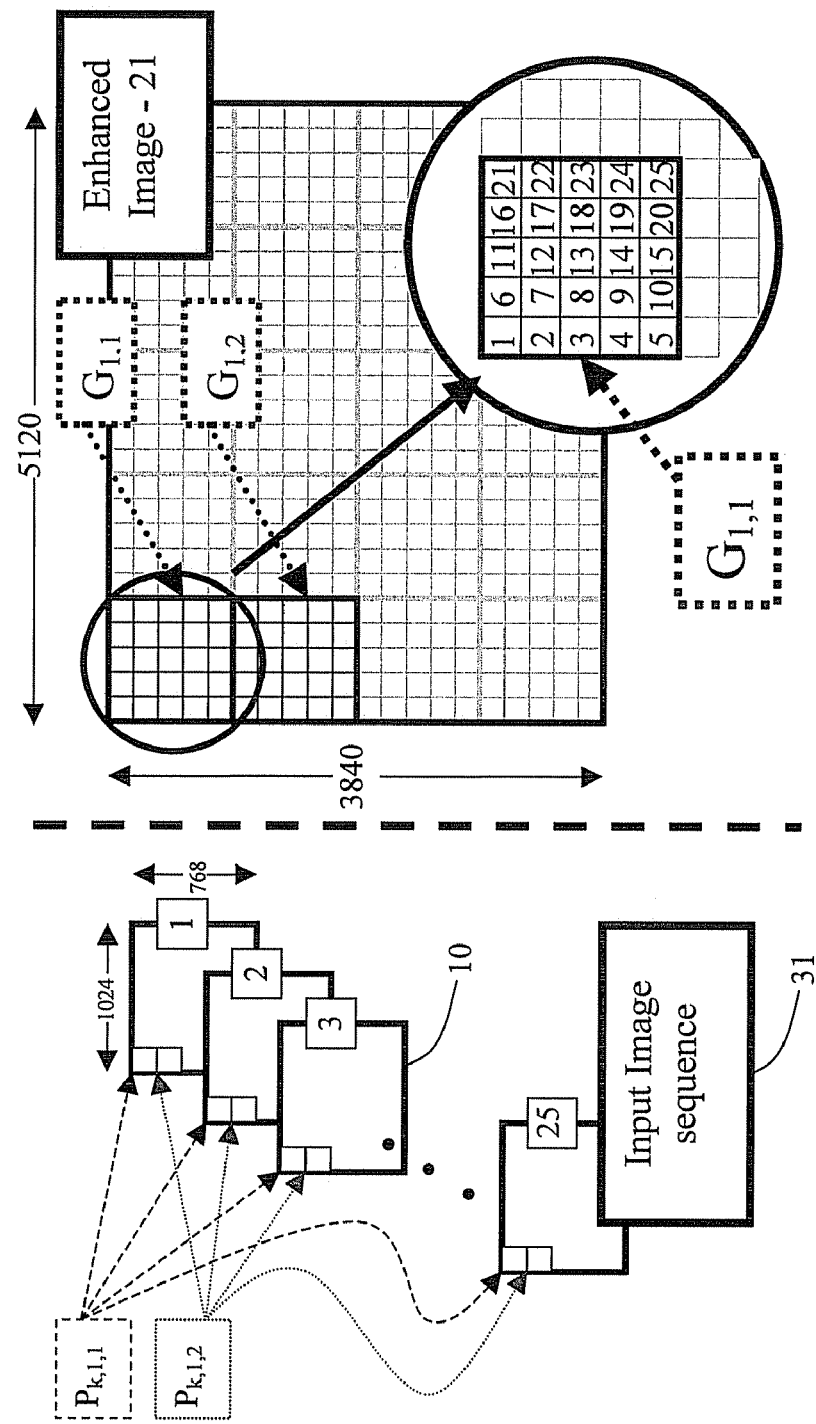
FIG. 9 relates FIG. 8 to the enhanced image.

Consider an example of image processing for generation of a tiled output image, depicted in FIG. 9. Note that aspects of the image processing are dependant upon the type of optical modulator used (e.g., the aperture array 40, a lens array, or other). In FIG. 9, the sub-images $P_{k,x,y}$ of the input image sequence 31 are mapped to pixel groups $G_{x,y}$ in the tiled image. The indices x and y represent offsets for each respective direction, while the k index denotes an offset in the input image sequence 31. To generate the intended 5120×3840 pixel tiled output image (i.e., the enhanced image 21), appropriate mapping is used to generate data for display. Each pixel group G in the tiled image consists of a 5×5 grid of pixel groups of size P (as shown in FIG. 8). Specifically, the group G[x,y] consists of P[1-25, x, y], which is to say that each group G consists of the set of groups P from each image within the input image sequence 31 with the same x index and y index. When the aperture array 40 is used as the optical modulator, each group P consists of only one pixel 100, and each group G consists of an array of 5×5 pixels 100. In some embodiment where a lens array is used as the optical modulator, each group P includes a set of 5×5 pixels, and each group G includes an array of 25×25 pixels.

Note that the foregoing makes reference to the fact that other optical modulators may be used in place of the aperture array 40. One skilled in the art will recognize that various lens arrays and other such components may be used advantageously. Accordingly, the aperture array 40, as well as other components presented herein, may be replaced, augmented or complimented by the use or substitution of other components that achieve the desired effects. Accordingly, it should be recognized that the components disclosed herein are merely illustrative and are not limiting of the teachings herein.

Inverse mapping between the image sequence 31 and the tiled output image determines the appropriate image processing for data sent to the display. As is shown in the diagram, a pixel group P from the image sequence 31 is mapped to a pixel group G in the output image.

The ordering of the K images in the input image sequence 31 for each x and y is shown in the inset in the bottom right of FIG. 9 (similar to FIG. 8). Formally, the relationship is given by P[k,x,y]=G[x,y,m,n] where the indices m and n denote the x and y pixel offsets in the 5×5 group of P, and may be determined according to Eqs. (2):

$$m=\mathrm{mod}(k/5)$$

$$n=5*\mathrm{floor}(k/5). \quad (2);$$

Figure 10:
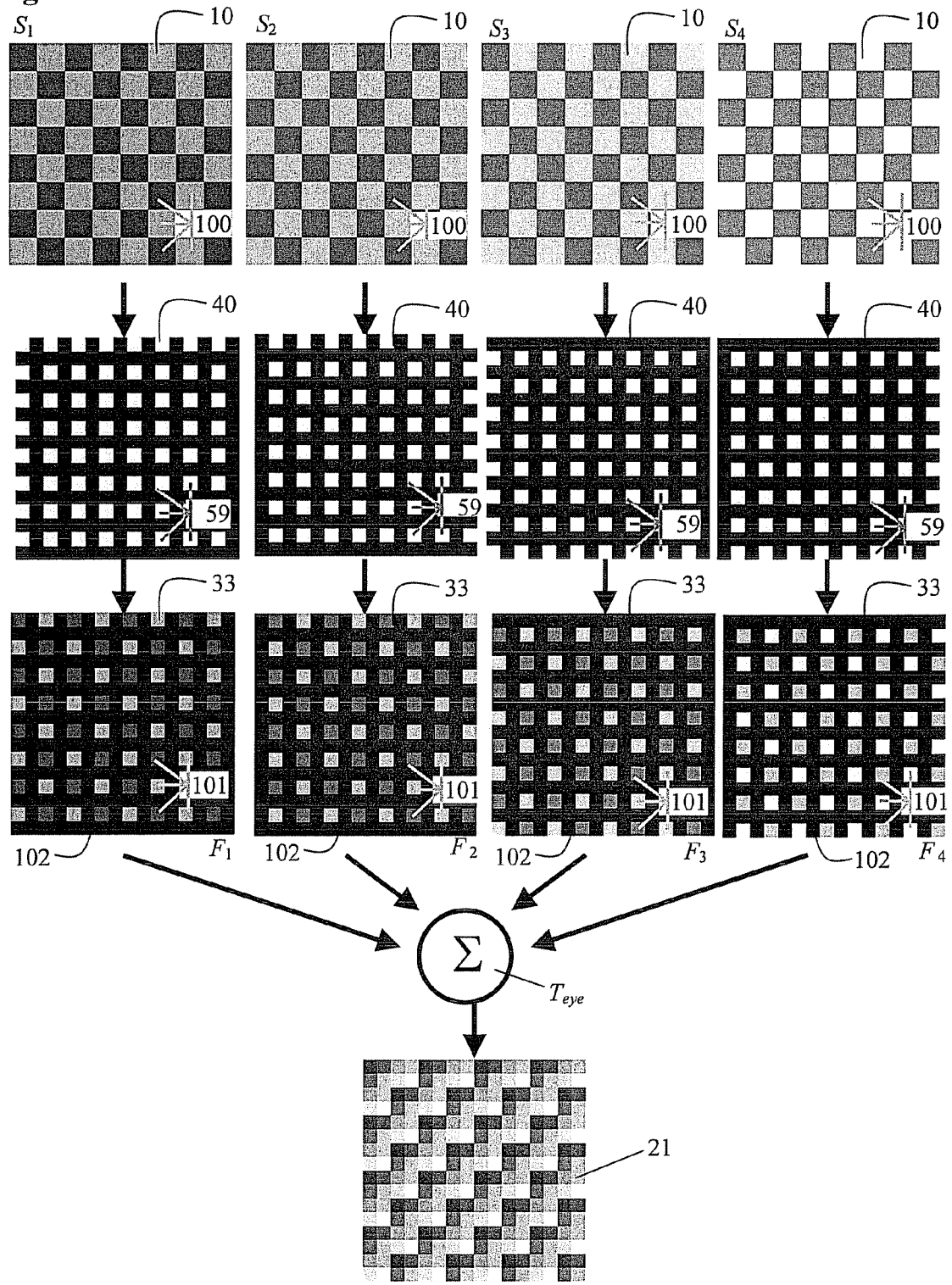
FIG. 10 illustrate generation of an enhanced image from an image sequence having four image sources.

Reference may be had to FIG. 10 which illustrates the resolution enhancement process integrated over four time steps. The top row illustrates four source images, which are filtered by the aperture array and tip/tilt scanner to generate the fully-filtered images shown in the third row. The fully-filtered images are projected by standard projection optics onto a standard diffuser screen. When observed with the human eye, persistence of vision fuses the four fully-filtered images into a resolution-enhanced output image as shown on the bottom.

In another embodiment, a lens array is used instead of the aperture array 40 for the optical filtering. Use of the lens array has a benefit of increased brightness in the enhanced image 21. This is depicted in FIG. 11.

Figure 11:
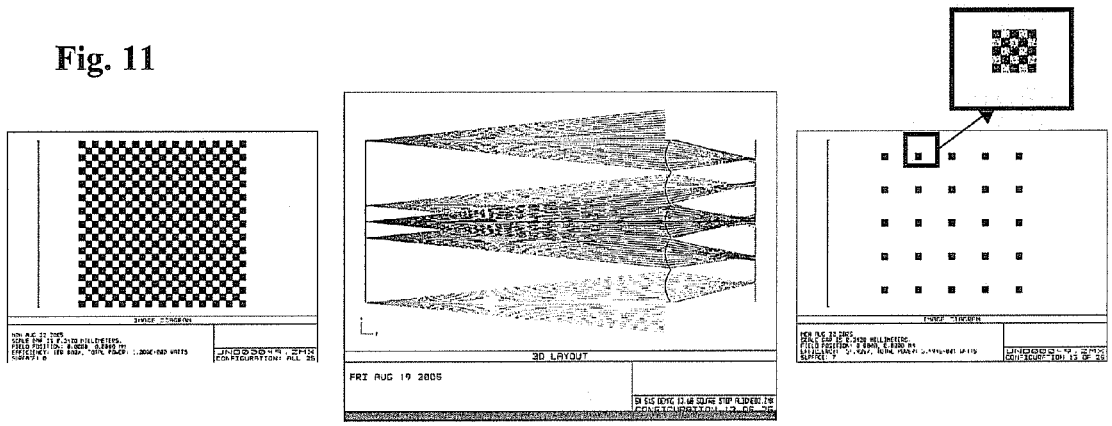
FIG. 11 depicts aspects of light modulation using a lens array.

In FIG. 11, a lens array is an alternative optical modulator. This configuration is generally an optically efficient alternative to the aperture array 40. One reason is that the lens array concentrates a significant amount of the light to within the desired boundaries of the sub-images 103. Another advantage of the lens array is that much larger images can be projected without significant loss in brightness.

In FIG. 11, the image on the left shows the source image 10 used for input into the optical modulator. Aspects of the lens are shown in the image in the middle, while the image on the right shows the filtered image 33 that is output. It can be verified that the filtered image 33 contains the same amount of pixels 100 as the source image 10, and maintains the same area. However, the active image area is typically smaller than when the aperture array 40 is used, due to dead-space between sub-images 103. In this embodiment, each sub-image $P_{x,y}$ forms a region of $\sqrt{K} \times \sqrt{K} = 5 \times 5$ pixels of the source image 10. In this case, there are (1024/5)×(768/5) sub-images 103.

The optical system can be considered a parallel imaging system, where each lenslet produces a sub-image from a 5×5 pixel region of the source image 10. Thus, the source image plane and the sub-image plane are optical conjugates of one another. The magnification of each lenslet is $1/\sqrt{K}=0.2$, thus the area of each sub-image is $1/K=\frac{1}{25}^{th}$ that of the pixel group that it is imaging. Since the sub-images only occupy $\frac{1}{25}$ the space of the source image, K=25 times as many pixels 100 may be tiled in the enhanced image.

In another embodiment, an aperture array 40 is placed on a plane side of the lens array, aligned with the clear apertures of each lenslet, and limiting the field size of the sub-images 103. Using the lens array optical modulator, the width of each pixel is 2.768 μm. However, the width of the sub-image 103 is equivalent to the pixel width on the DLP chip 52 (of about 13.68 μm). Grid spacing for the sub-image 103 is about $\sqrt{K} \times 13.68$ μm=5×13.68 μm=68.4 μm.

In other embodiments, the aperture array 40 does not require a one-to-one correspondence to pixels 100 of the source image 10. That is, the apertures 59 can be located at different locations than pixels 100 of the source image 10, and the number of apertures 59 need not equal the number of pixels 100 in the source image 10.

In further embodiments, it is possible to use electrically controllable optical modulators. Such modulators have optical properties that can be electrically modified to produce an appropriate optical filter sequence. For instance, an LCD device could be used to generate the appropriate amplitude modulation patterns required by the aperture mask filter sequence.

Scanning does not have to be tiled, and make take on a variety of characteristics. For example, optical modulators can be used in conjunction with various scanners that stagger or randomize the sub-images 103. This provides the benefit of reducing unwanted image artifacts due to rapid eye motion across the enhanced image 21. For example, the optical modulator can include an aperture array 40 with translucent regions in a "Knight's move" pattern. Scanning may involve rotational, translational, electrical, mechanical, electro-mechanical, optical and other techniques for manipulating projection.

The optical filter can incorporate an x-y translational scanner 48 rather than a tip/tilt scanner 48. This is illustrated in FIG. 12.

Figure 12:
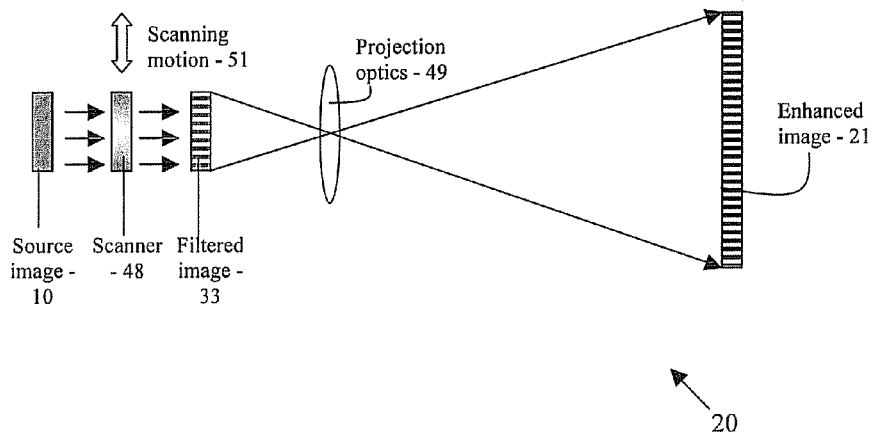
FIG. 12 depicts aspects of an HRIS that uses translational motion for scanning.

In FIG. 12, the scanner 48 moves in a grid of $\sqrt{K} \times \sqrt{K}=5 \times 5$ equally spaced positions within 40 ms. Each position of the scanner 48 is synchronized with the display of a respective source image 10 of the input image sequence 31. The displacement of the scanner 48 depends on the type of optical filter 32 that is used. Typically, the grid spacing X-step is equal to the width of each sub-image 103 of the filtered images 33. Thus, when an aperture array optical modulator is used, X-step=2.768 um. When a lens array optical modulator is used, Xstep=13.68 um.

When the translating scanner 48 is used, a tiled image is presented at the filtered image plane. This plane is presented as the input to the projection system. The image that is projected on the screen is a magnified version of the tiled image at the filtered image plane. The optical filter and the translating scanner together produce the desired optical filter sequence.

Aspects of this transformation sequence are shown in FIG. 8. The filter pattern with a width of W and height H is translated in a grid of 5×5 positions separated by Y-step and X-step. A full range of travel of the pattern is Y-range and X-range. The grid on the left shows the sequence of positions over time. For typical embodiments described, Y-step=X-step and Y-range=X-range.

Further aspects of scanning are now considered with some detail.

Figure 13:
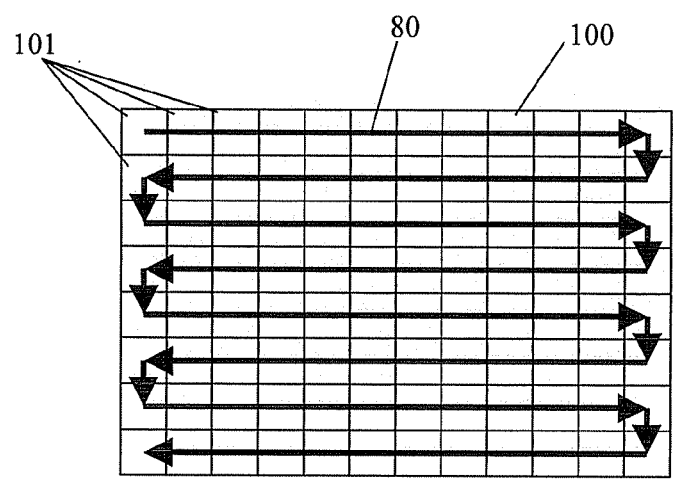
FIG. 13 illustrates a scan pattern having two degrees of freedom.

Refer now to FIG. 13, which illustrates one embodiment of a scan pattern 80. The scan pattern 80 includes a two-degree-of-freedom (2-DOF) or "two-dimensional" scan pattern 80. The 2-DOF scan pattern 80 typically scans an array of sub-pixels 101 within a pixel 100. The 2-DOF scan pattern 80 shown is boustrophedonic (left-to-right, then right-to-left, etc.). There are a variety of similarly applicable scan patterns 80, such as a left-to-right scan followed by a rapid retrace from right-to-left. Another example is a Lissajous pattern that fully covers the enhanced resolution image surface and decreases the bandwidth requirements of the scanning optic.

The two-dimensional scan of the sub-pixel 101 achieves desired coverage. However, this scan pattern 80 requires at least two scan directions and high-bandwidth control. To reduce system cost and complexity, it is possible to use a one degree-of-freedom (1-DOF) scan pattern 80. See FIG. 14, which illustrates a 1-DOF scan pattern 80.

Figure 14:
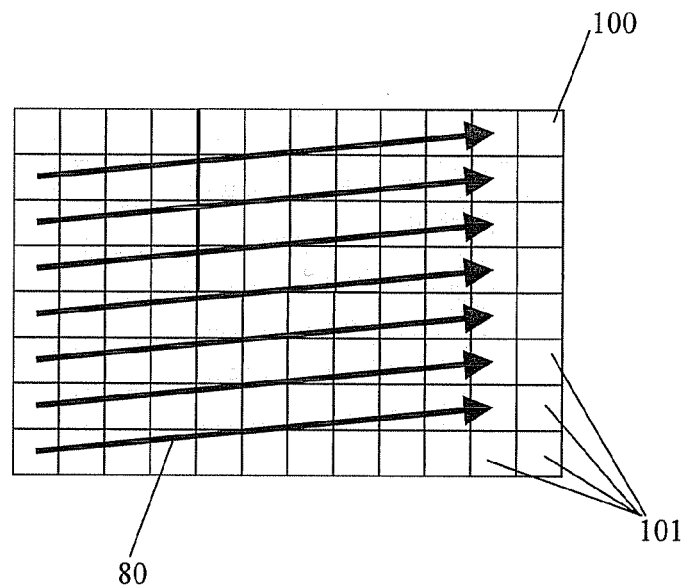
FIG. 14 illustrates a scan pattern having one degree of freedom.

In FIG. 14, the HRIS 20 scans at least one sub-pixel 101 of an array of pixels 100 (note that only one pixel 100 is shown in FIG. 14). The scan pattern 80 proceeds along a trajectory attainable by electro-optic components having one degree of freedom. The 1-D scan pattern 80 achieves full coverage of the enhanced image 21. The array of windowed source pixels 101 is scanned in one direction.

Figure 15:
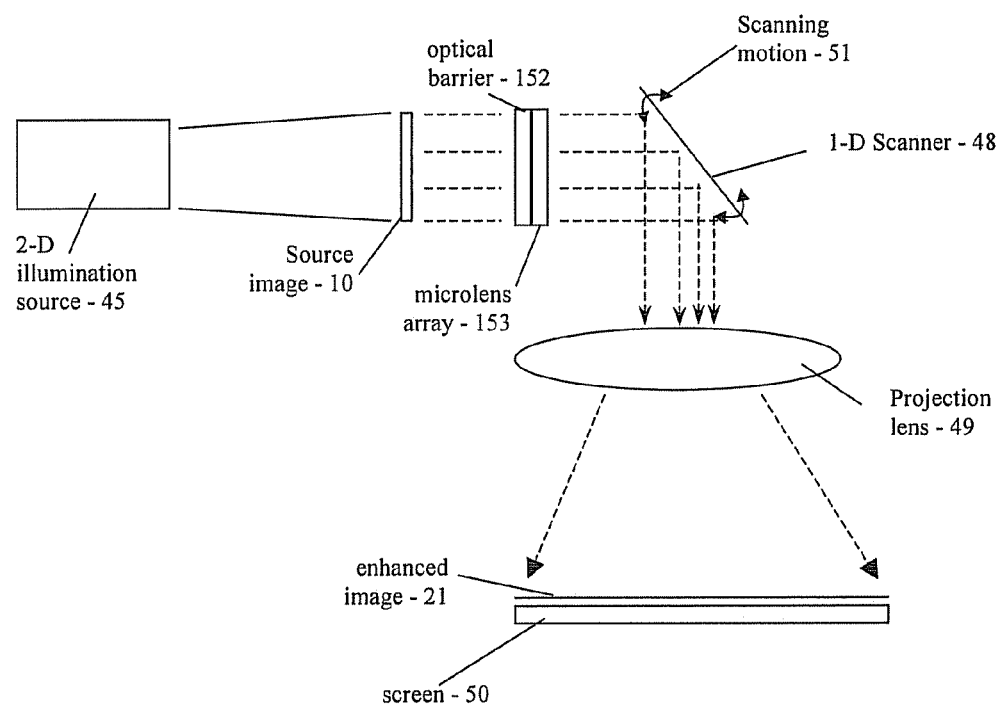
FIG. 15 illustrates aspects of another embodiment for the HRIS.

An additional embodiment is depicted in FIG. 15. In FIG. 15, a 2-D illumination source generates one or more source images 10. The 2-D illumination source 45 may be, for example, a high-frame rate digital projector, such as one using micro-electromechanical systems-based spatial light modulators, illumination optics, and a multi-segment color wheel. Typical systems are described in Texas Instruments, Inc. Application Report Discovery DLPA002, "Single-panel DLP projection system optics," published March 2005, incorporated herein by reference.

The source image 10 is modulated by an optical barrier 152 and a microlens array 153. The role of optical barrier 152 and microlens array 153 is to generate a low spatial duty cycle array of one or more windowed source pixels 101 (i.e., the sub-pixels 101). That is, the optical barrier 152 and microlens array 153 receive the source image 10 and output image data as the plurality of sub-pixels 101. In one embodiment, the optical barrier 152 and the microlens array 153 abut and form a single optical structure.

In some embodiments, the microlens array 153 is optional. Typically, the microlens array 153 increases image brightness.

Further aspects of an exemplary optical barrier 152 are provided in FIG. 16A, with aspects of an exemplary microlens array 153 being provided in FIG. 16B. Typically, the optical barrier 152 is a black chrome mask measuring approximately 15 mm×11 mm having a black chrome layer about 300 nanometers thick upon a piece of D263T Schott glass of about 500 microns thick (where exemplary Schott glass includes a borosilicate glass type and distributed by Schott North America of Elmsford N.Y.). In one embodiment, the optical barrier 152 has an array of 1,096×804 translucent apertures on a 13.68 micron pitch, which matches the pitch of the source image 10. The translucent apertures are rectangular, measuring 2.28 microns by 4.56 microns. This pattern is referred to as a "6×3 pixel pattern."

Typically, the microlens array 153 is a "fly's eye" lens array having a pitch of 13.68 microns. The microlens array 153 is aligned such that a lens covers each clear aperture of the optical barrier 152. As will be obvious to those skilled in the art, the radius of curvature and lens thickness are a function of a local numerical aperture.

Refer back to FIG. 15. Generally, an optical signal for the source image 10 is modulated rapidly in wavelength and intensity by the 2-D illumination source 45. The modulation is a function of the desired enhanced resolution image 21.

In various embodiments where the scanner 48 is the 1-DOF scanner 48, the 1-DOF scanner 48 rotates or translates in synchrony with the image sequence 31. In one embodiment, the 1-DOF scanner 48 serves to gradually translate the source image 10 across the screen 50. Aspects of this embodiment are now explained in greater detail.

The 1-DOF scanner 48 can be a one axis tilting piezo stage with mirror, such as Piezosystem Jena model number PSH 4/1. The scanner 48 has an outside diameter of 12 mm, is 20 mm high, and has a total angular travel range of 4 mrad, using control electronics as are well-known in the art. A typical control waveform is discussed below.

Figure 17:
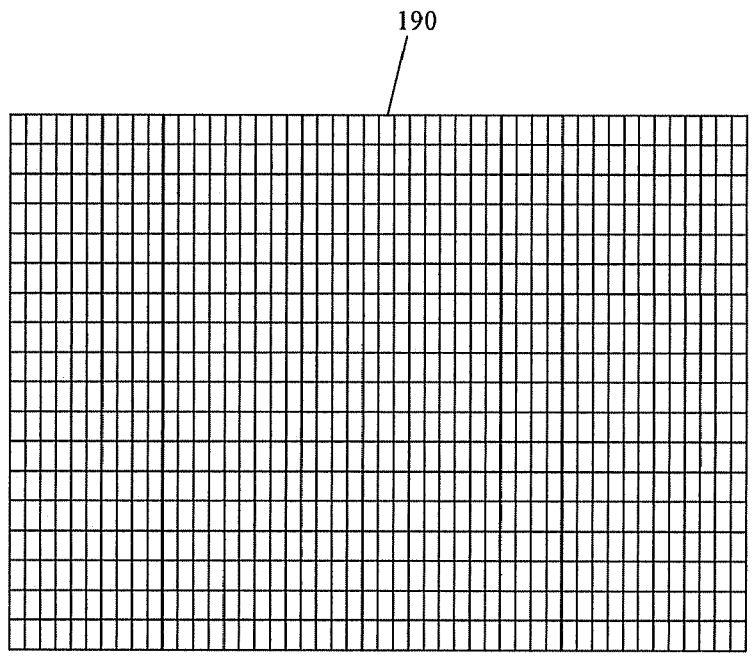
FIG. 17 illustrates an enhanced resolution image surface in pixel-data space.

See FIG. 17, which illustrates the enhanced resolution image surface in pixel-data space 190. In operation, the enhanced resolution image surface in pixel-data space 190 is an approximation or sampled version of the actual enhanced resolution image surface 50. This distinction is illustrated in FIG. 18.

Figure 18:
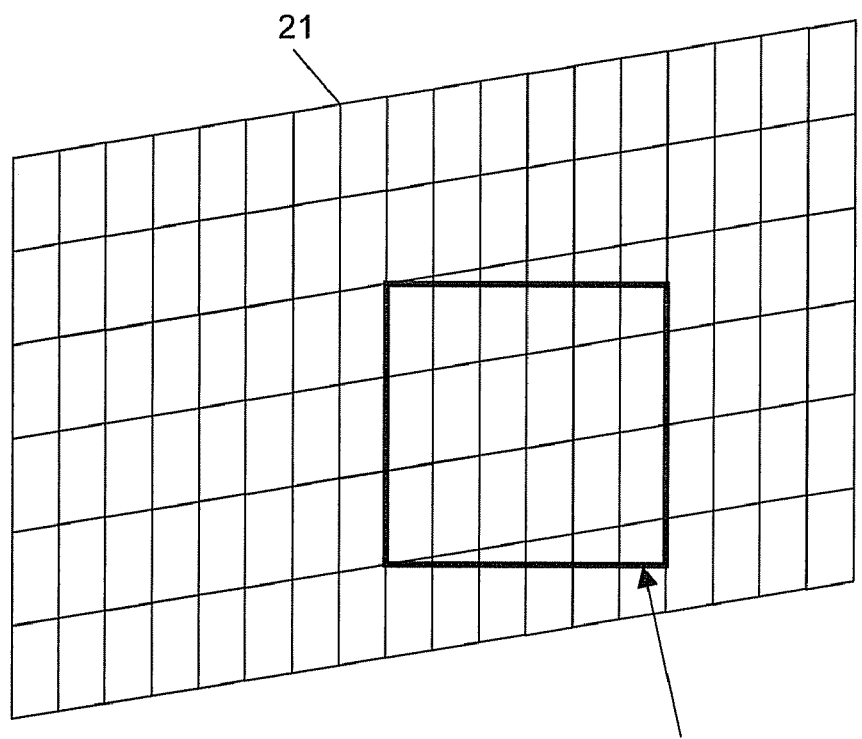
FIG. 18 illustrates an area for a pixel on the enhanced resolution image surface.

FIG. 18 illustrates the pixelized enhanced resolution image 21 and the instantaneous image of a single source pixel 100. In the preferred embodiment, the footprint of the single source pixel 100 covers six columns and three rows of the enhanced resolution image surface in display space 50 and pixel-data space 190.

Figure 19:
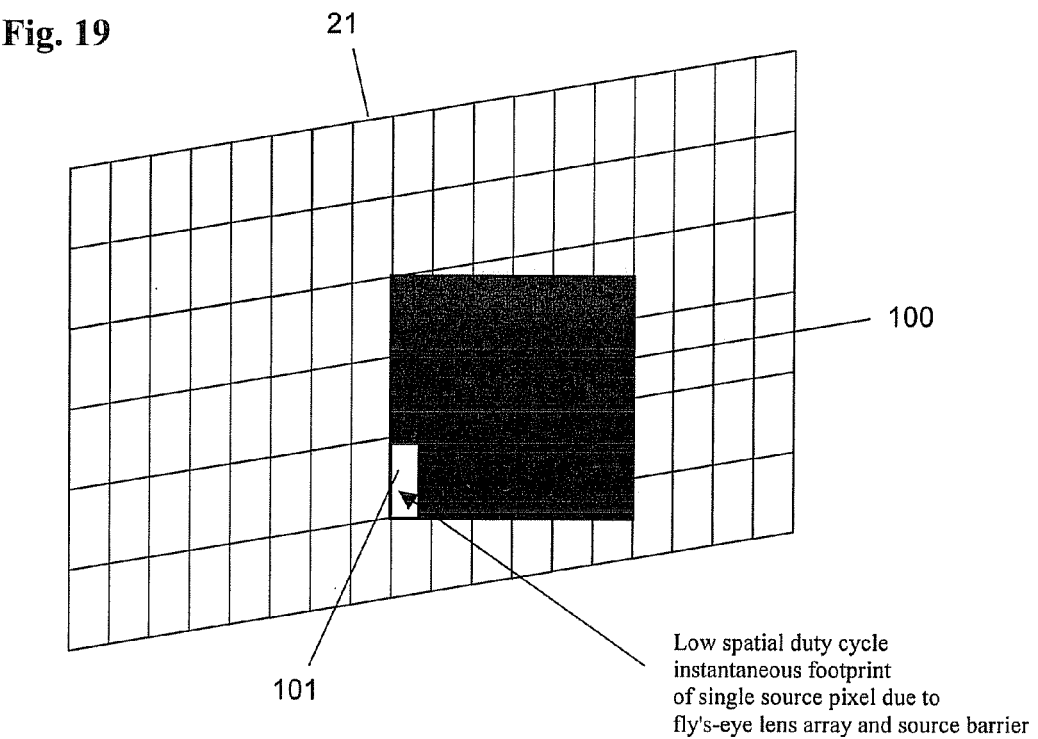
FIG. 19 illustrates an enhanced-resolution pixel (a sub-pixel) with respect to the area of the pixel.

Due to upstream windowing of each source pixel 100, the true radiative footprint of a single subpixel 101 at one instant in time is smaller than the footprint of a source pixel 100. A resulting subpixel 101 is depicted in FIG. 19. Here, the sub-pixel 101 is in the lower-left corner of the single pixel instantaneous footprint 100. Of course, the pixel could be placed elsewhere, such as in the center of the single pixel instantaneous footprint 100. It will be obvious to those skilled in the art that this is partially a function of the deign of the optical barrier 152 and/or lens array 153.

Figure 20:
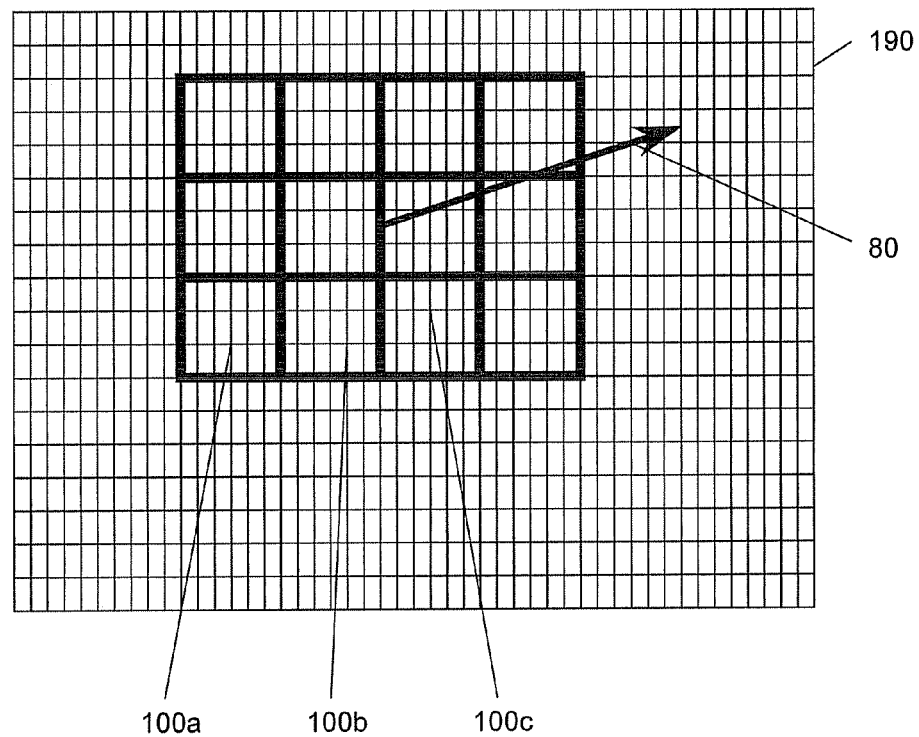
FIG. 20 illustrates an instantaneous area of a collection of pixels in the enhanced image pixel-data space.

See FIG. 20. A field of 1024×768 source pixels operates in 18 time steps in conjunction with the 1-DOF scanner 48. Neglecting edge effects, such as incomplete coverage of the edges of the enhanced resolution image surface, this therefore generates approximately 14,000,000 pixels from 768,432 source pixels. It will be obvious that nearly any scan slope and set of projection ratios can be chosen. For the sake of discussion, in the preferred embodiment, each subpixel 101 has a footprint covering 6×3 enhanced resolution image pixels. In the preferred embodiment, the optical barrier 152 is chosen with regard to the system optics to admit light that corresponds to a single subpixel 101. Therefore, it will take 6×3=18 time steps and a 1-DOF scan pattern 80 of slope 1:3 (in "SLM pixel footprint space") to fully cover the enhanced resolution pixel surface 21. (Of course, a slope of 3:1 can be used if a vertical scan is desired.)

FIG. 20 shows the instantaneous footprint of 12 source pixels 10a, 10b, 10c, . . . in enhanced image pixel-data space 190 and the 1-DOF scan pattern 80.

Figure 21:
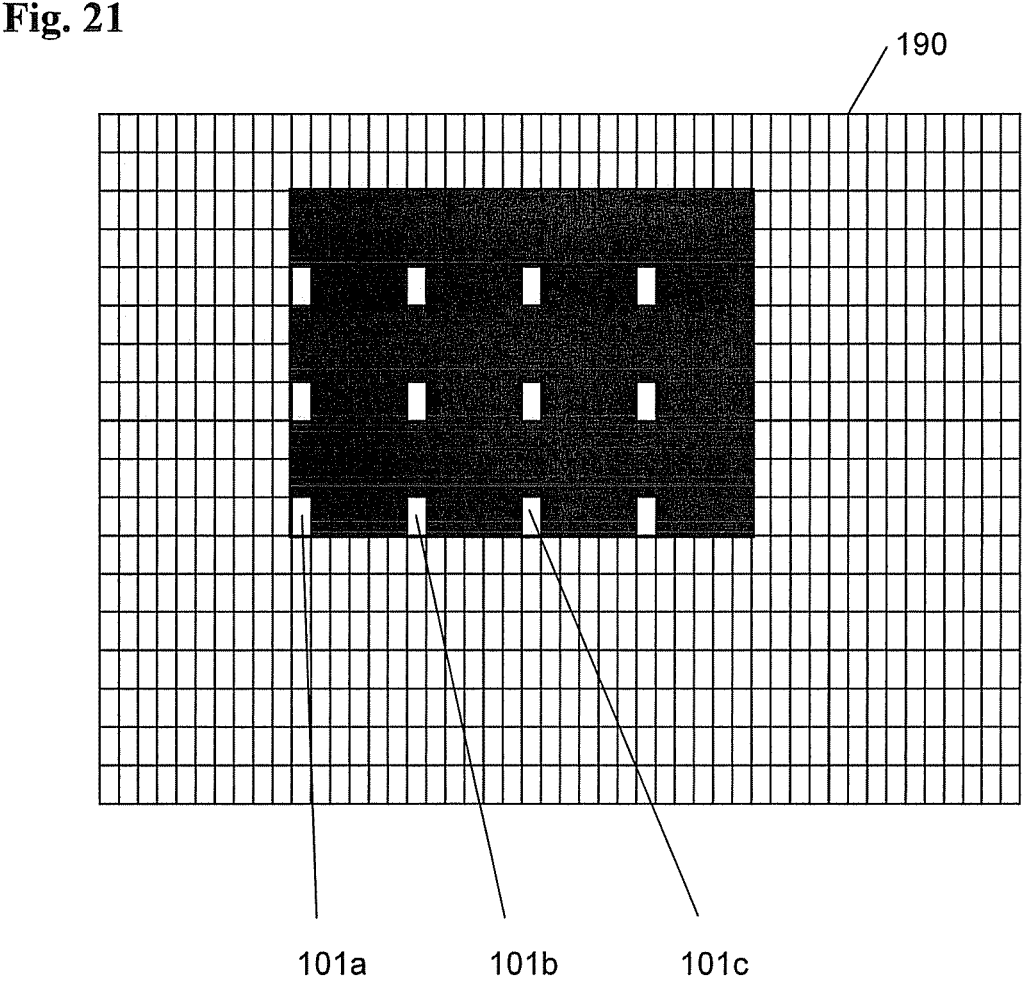
FIG. 21 illustrates the instantaneous area of a collection of windowed pixels (sub-pixels) in enhanced image pixel-data space.

See also FIG. 21, which shows the instantaneous footprint of 12 sub-pixels 101a, 101b, . . . in enhanced pixel-data space 190. In this case, the windowing is chosen to be in the lower-left corner of the footprint of each source pixel 100. As discussed above, the windowing can also be chosen to be in the center of each source pixel 100.

Figure 22:
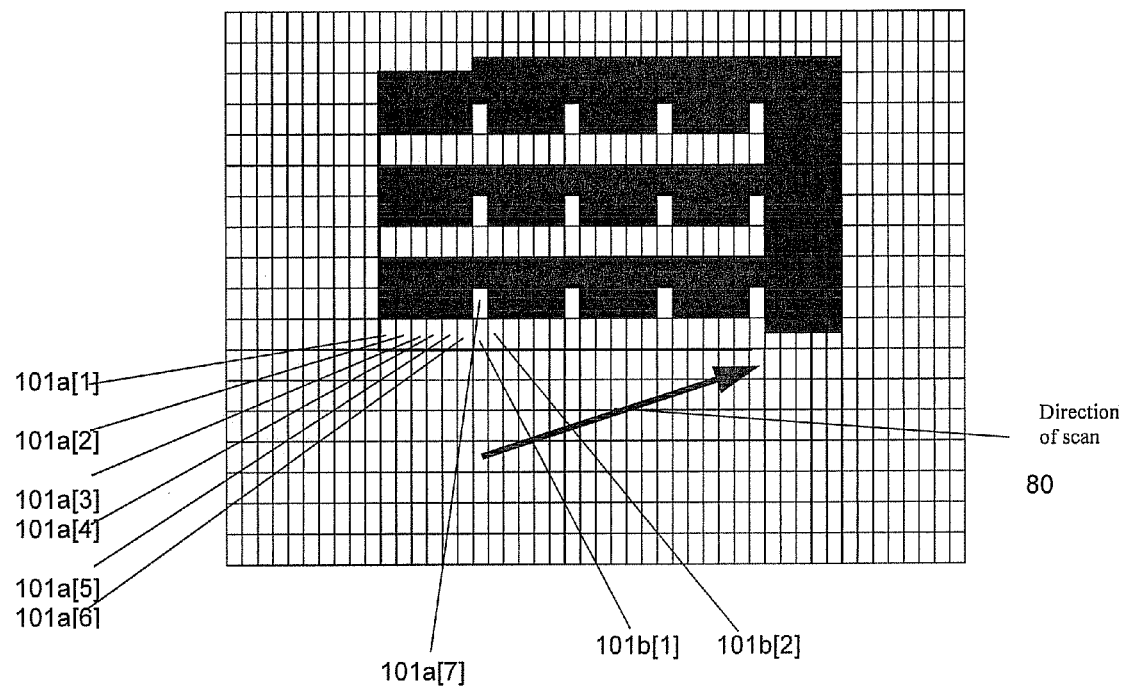
FIG. 22 shows the enhanced resolution image surface as integrated by the persistence of vision over several time steps.

FIG. 22 shows the enhanced resolution image in data space 190 as integrated over seven time steps, [t=1, . . . , t=7]. Time step 1 corresponds to the projection of pixels 101a[1], 101b[1], and so on. Time step 2 corresponds to the projection of pixels 101a[2], 101b[2], and so on. Note that the 1:6 scan slope (in "enhanced pixel data space", which has a non-square footprint) results in pixel 101a[7] being drawn one row higher than pixels 101a/1:6]. Of course, a different slope, such as 6:1, can be used if desired.

In many applications, the 2-D illumination source 45 will be able to produce illumination of various wavelengths and amplitudes. One well-known way to achieve this is by using a rotating color wheel, such as the ColorWheel technologies from Unaxis.

Figure 23:
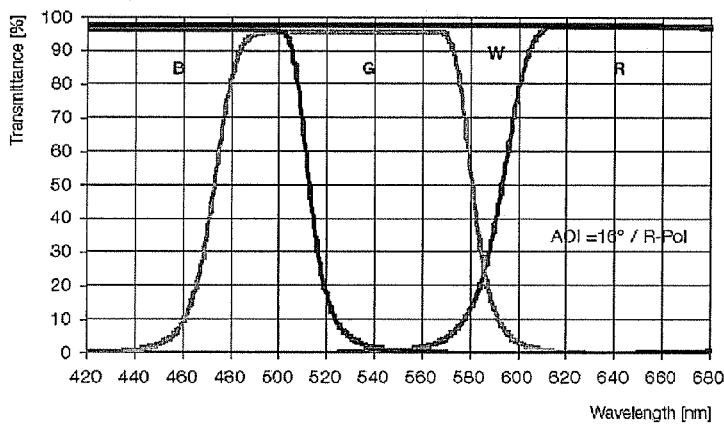
FIG. 23 provides a tabulation of color wheel segments.

In the preferred embodiment, the enhanced-resolution projection system creates full-color imagery in which each pixel has red, green, and blue components. One way to achieve this is to use a 15-segment color wheel of 5 red segments, 5 green segments, and 5 blue segments. Aspects of this arrangement are provided below in Table 1, and depicted in FIG. 23. Each group of 5 segments contains a neutral density filter overlay with transmission % as illustrated. For example, to create a red pixel of intensity 38.7%, the windowed pixel should be switched on during segment 2 (50%) and segment 3 (25%), because (50+25)/(100+50+25+12.5+6.25)=38.7%.

TABLE 1

Color Generation with a Colorwheel

| Segment | Color | Method A Transmission (%) | Method B Transmission (%) |
|---|---|---|---|
| 1 | red | 100 | 6.25 |
| 2 | red | 50 | 50 |
| 3 | red | 25 | 100 |
| 4 | red | 12.5 | 25 |
| 5 | red | 6.25 | 12.5 |
| 6 | green | 100 | 6.25 |
| 7 | green | 50 | 50 |
| 8 | green | 25 | 100 |
| 9 | green | 12.5 | 25 |
| 10 | green | 6.25 | 12.5 |
| 11 | blue | 100 | 6.25 |
| 12 | blue | 50 | 50 |
| 13 | blue | 25 | 100 |
| 14 | blue | 12.5 | 25 |
| 15 | blue | 6.25 | 12.5 |

Of course, the 2-D illumination source 45 and control data must be configured to deal properly with the intervals during which the color wheel passes between segments.

One way to mitigate this issue is shown as "Method B", in which the segment transmission % is reordered to de-emphasize color-sector transitions and other artifacts.

Figure 24:
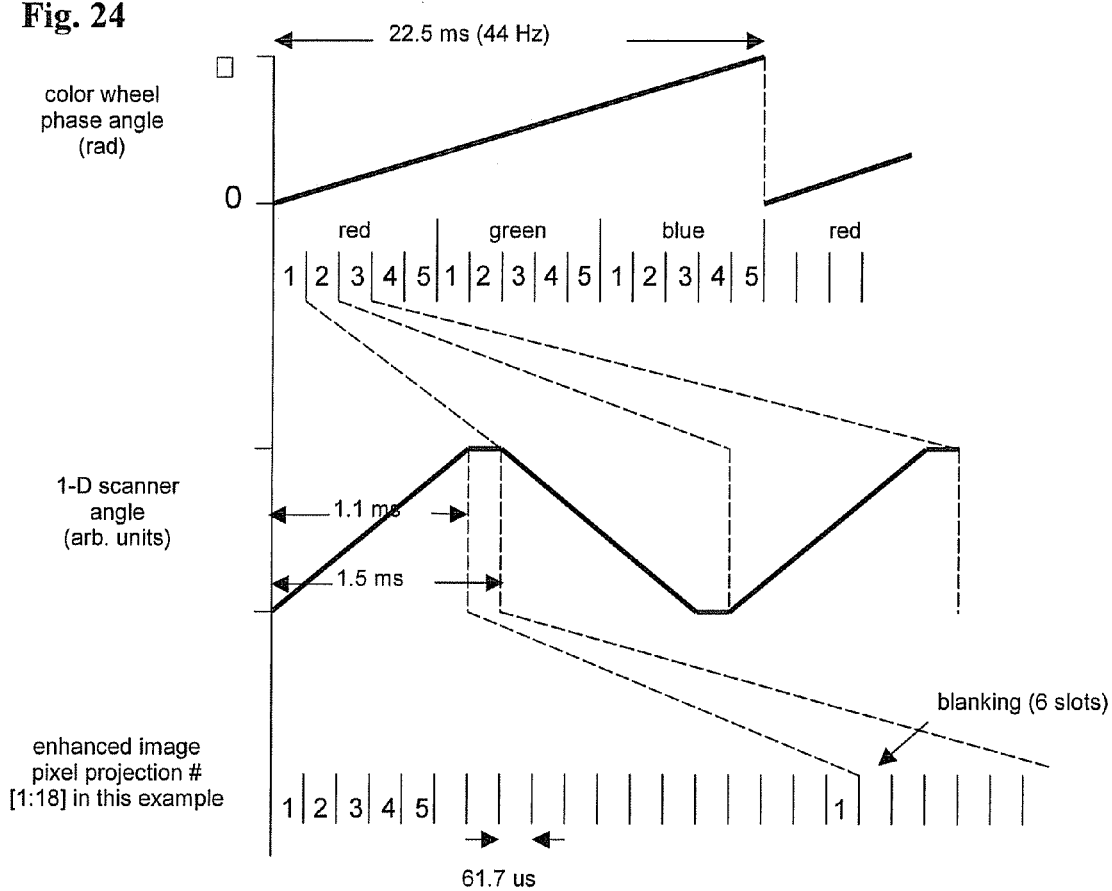
FIG. 24 provides a system timing diagram.

FIG. 24 illustrates the system timing diagram of the illustrated embodiment. The set of K filtered images 33 is projected at 44 Hz to minimize the perception of image flicker. The color wheel rotates through all segments at 44 Hz, which is a period of 22.2 ms. Assuming equal angular spacing between segments, approximately 1.5 ms occurs between segment intervals. Within each segment, the 1-DOF scanner 48 sweeps across its range of motion and rests briefly at the extremum for a blanking interval. Eighteen (18) patterns are projected by the 2-D illumination source while the 1-DOF scanner 48 performs this sweep, corresponding to the discussion of FIG. 20. Each of the eighteen (18) scan pattern 80 is illuminated for approximately 61.7 us (16,200 Hz). Assume the blanking interval lasts six time steps, or 389 us.

The 1-DOF scanner sweeps in the opposite direction for the next color wheel segment, rests at the extremum, and so on.

Thus, an enhanced-resolution image 21 is created. As discussed, given a 2-D illumination source of XGA resolution (1024×768 pixels) capable of 16,200 Hz operation, and eighteen (18) time steps, the embodiment will create an image of 14 million pixels.

Figure 25:
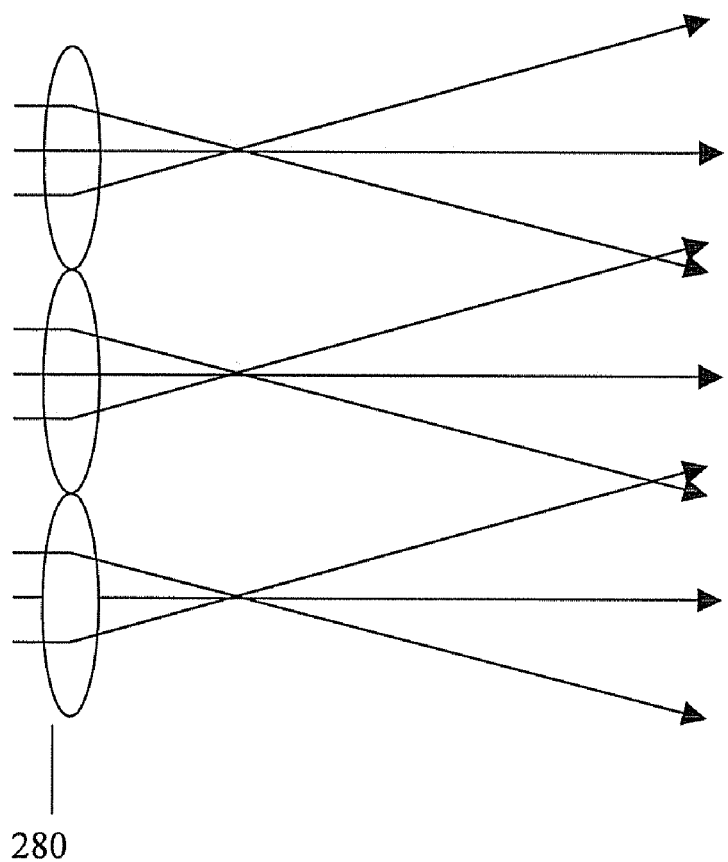
FIG. 25 illustrates aspects of a lenticular array.

The present invention can be used to create three-dimensional images using, for example, spatial multiplexing techniques that use a lenticular array or parallax barrier. Such displays are well-known to those skilled in the art of three-dimensional display optical design. A top-down illustration of a typical lenticular lens 3-D display is shown in FIG. 25. A lenticular lens array 280 directs light from incident sub-pixels 101 along various trajectories as dictated by the characteristics of the lenticular lens array 280 and the position and incident angle of each sub-pixel 101.

The enhanced-resolution image surface provides more pixels behind each lenticule than previous systems. The perceived depth of a 3-D image is directly proportional to the number of pixels behind each lenticule because the ray trajectories exiting the projection surface are more finely quantized. Therefore, the present invention enables spatially-multiplexed 3-D images with greatly increased sense of depth over existing systems.

Figure 26:
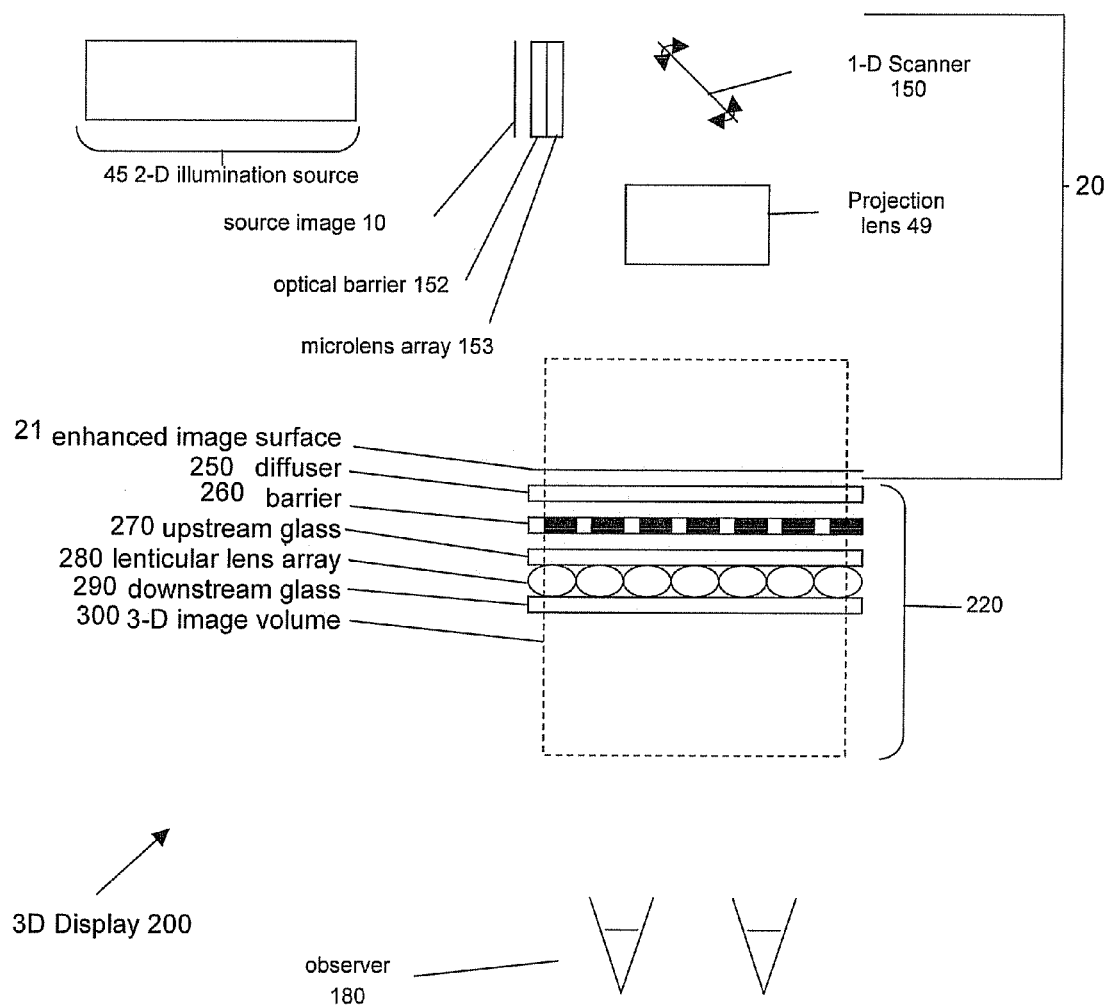
FIG. 26 illustrates aspects of a high-resolution three-dimensional (3D) display.

See FIG. 26 which illustrates a 3D display 200. The 3D display 200 includes an enhanced-resolution 2-D display 20 and 3D image projection optics 220. 3D imagery is projected into a volume approximately indicated by a 3D image volume 300 and is visible by an observer 180 across a horizontal field of view that is a function of the 3D image projection optics 220.

The 3D image projection optics 220 includes a diffuser 250 that scatters the illumination from the enhanced image surface 21 to an inter-view barrier 260. The inter-view barrier 260 passes modulated light to a lenticular lens array 280 that is mounted between an upstream glass plate 270 and a downstream glass plate 290. The lenticular array can be any of a number of well-known lenticular arrays, or can be replaced with an optical element that serves the purpose of optically demultiplexing pixels at the enhanced image surface 21 to a variety of ray trajectories toward one or more observers. Alternatives to the lenticular lens array 280 include a parallax barrier array, a multi-element holographic optical element, and a fly's-eye lens array (for full-parallax 3D images).

Figure 27:
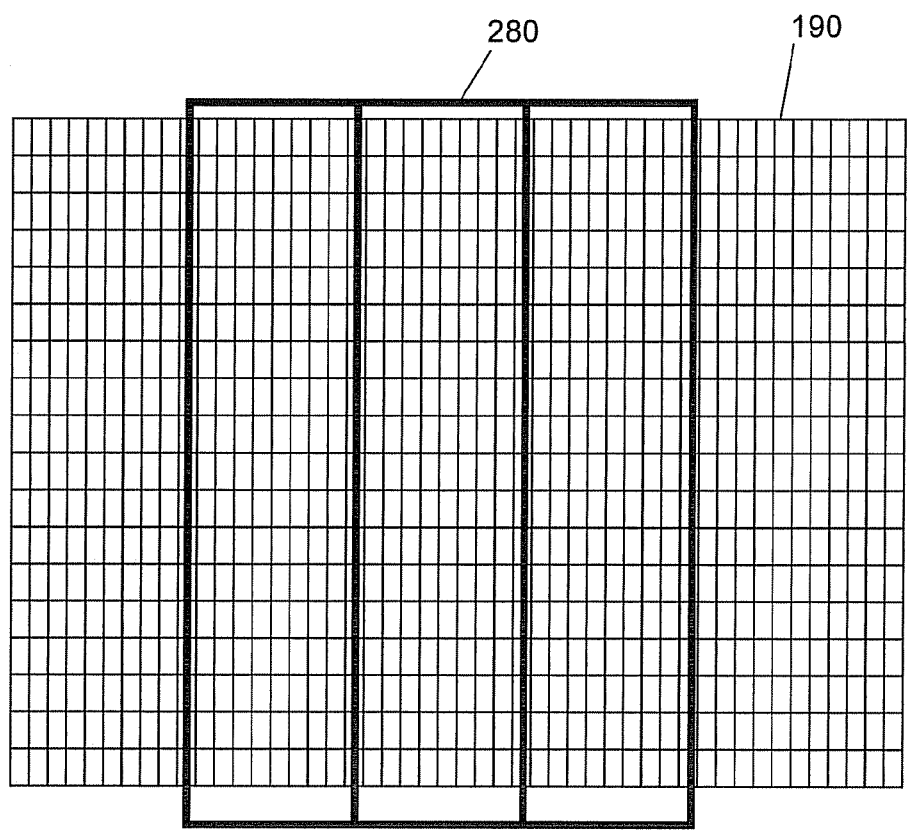
FIG. 27 shows the lenticular lens array superimposed on the enhanced resolution image surface.

FIG. 27 depicts the typical alignment and scaling of the lenticular lens array 280 and the enhanced resolution pixel surface in pixel data space 190.

Figure 28:
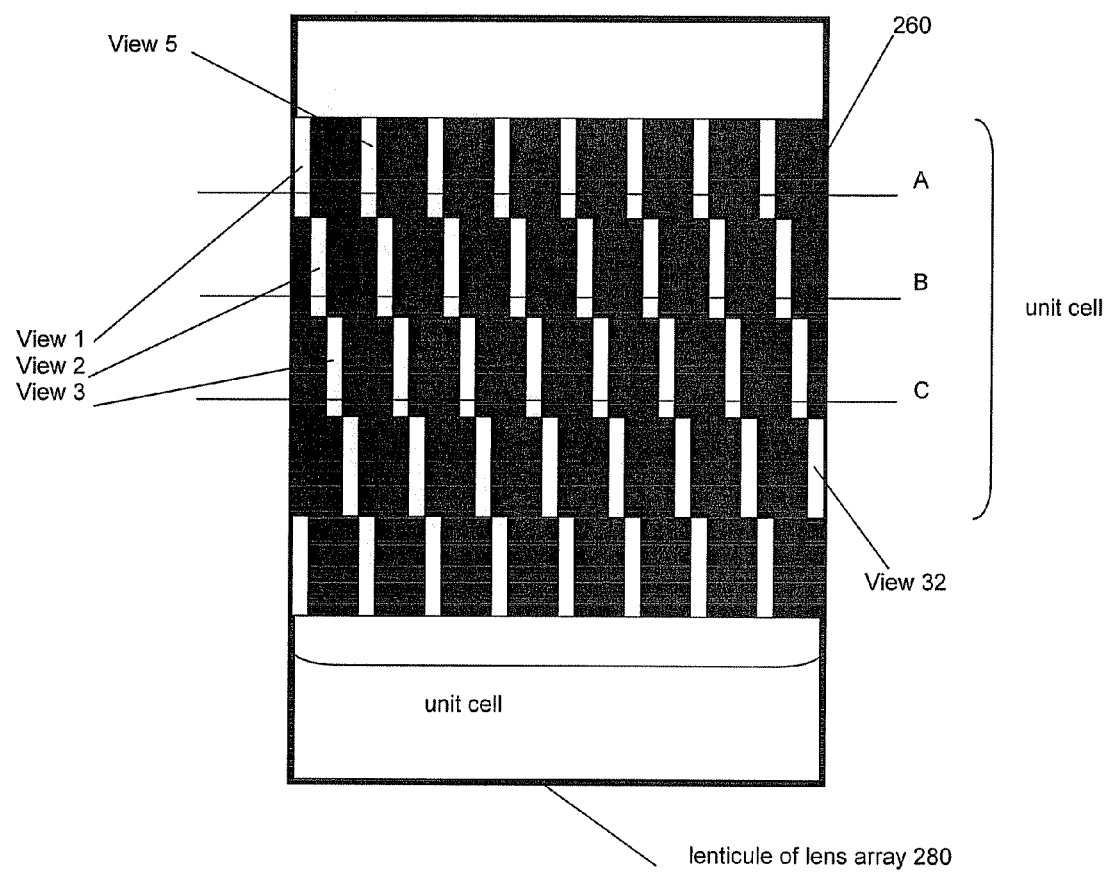
FIG. 28 shows aspects of an inter-view barrier.

FIG. 28 depicts the inter-view barrier 260 that is composed of a series of light-blocking regions that serve as apertures guiding and limiting the trajectories of light as they enter the lenticular lens array 280. This results in a higher contrast 3D image with more sharply defined depth. A version of this technique is discussed in Provisional Patent Application "Image Enhancement for Three-Dimensional Displays" (ASI-0133/ACS-0037) to Actuality Systems filed under U.S. Ser. No. 60/777,043, filed on Feb. 27, 2006, which is incorporated herein by reference.

To facilitate discussion, three horizontal cutting planes are indicated as (A), (B), and (C).

In the illustrated embodiment, the inter-view barrier 260 is a repeating pattern of translucent windows and opaque regions. The aspect ratio of each feature has a ratio of 6:1 (vertical:horizontal). Each window has a size of one feature, and each opaque region is 3 features across. A "unit cell" of the pattern has 32 translucent windows, staggered as illustrated in FIG. 28.

Figure 29:
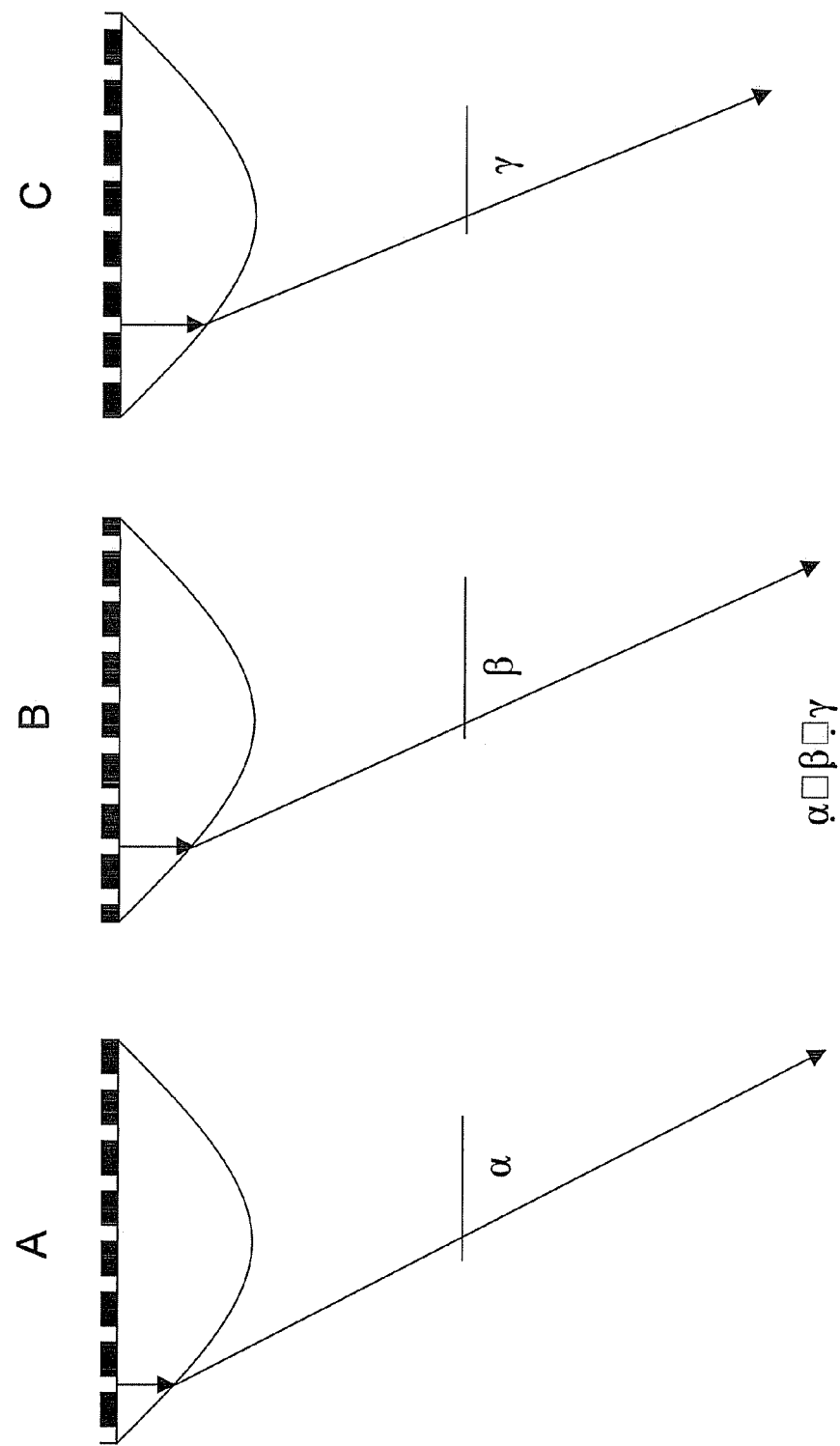
FIG. 29 illustrates aspects of a beam-steering function of a lenticule for three pixels of different horizontal location; and, FIG. 30 depicts aspects of the enhanced image from a rotated optic.

FIG. 29 is a top-down view of the light-steering action of the lenticular lens array in conjunction with three lighted pixels. As is well-known, the exit angle of each light ray is a function of the horizontal position of the input pixel.

The embodiment disclosed above uses a 1-DOF scan trajectory with a slope of 3:1. Other slope scans can, however, be used. Also, the velocity and overall waveform of the scan can be matched to desired system parameters and scanner bandwidth. For example, a higher-bandwidth scanner enables scan to happen twice as frequently; this can be used for faster image update, utilization of different color wheel schemes, or other benefits.

Figure 30:
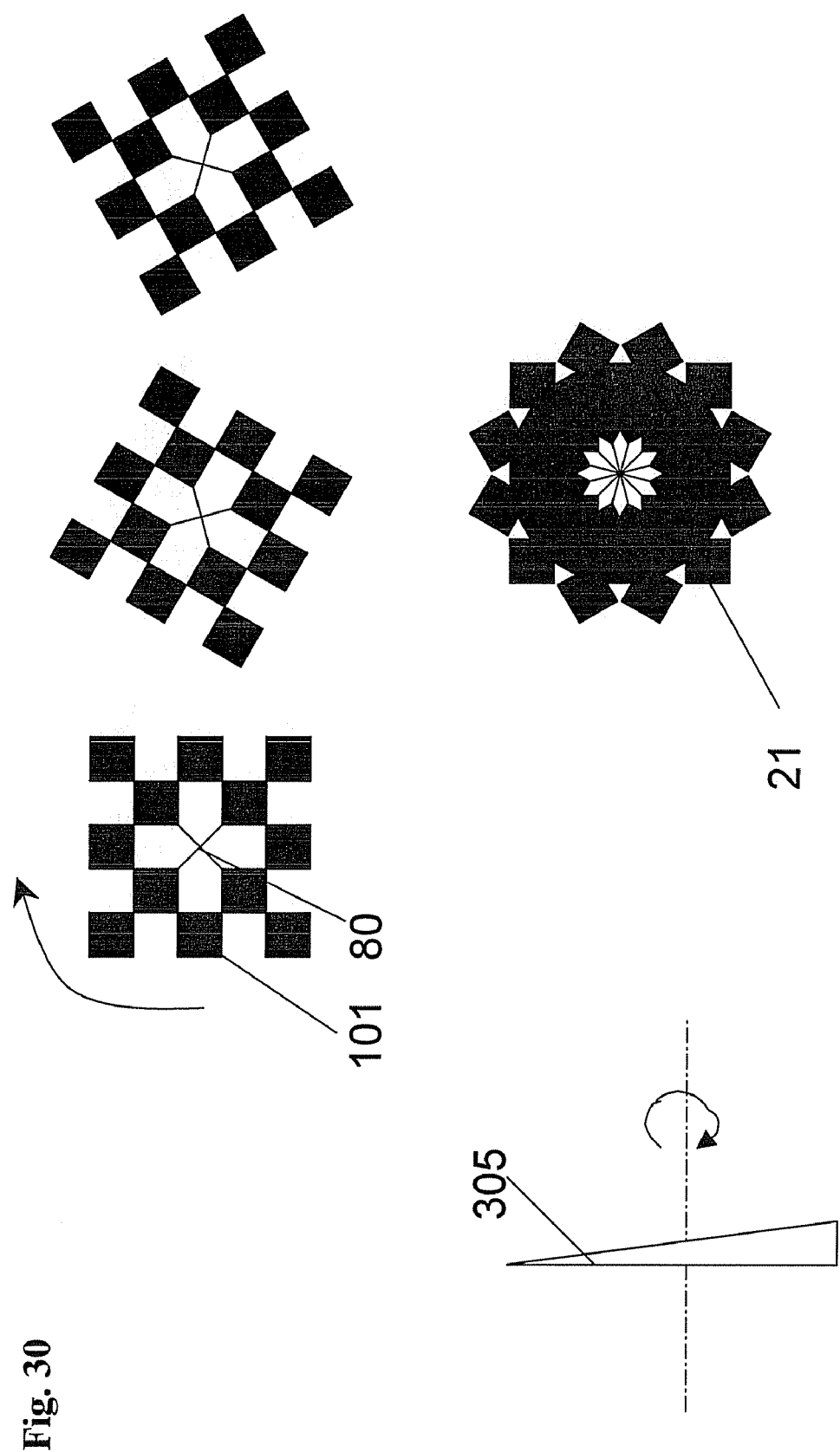

The 1-DOF scanner can rotate an optic about an axis substantially normal to its face. See FIG. 30. For example, the 1-DOF scanner can be a thin glass wedge 305 that causes the image of windowed source pixels to traverse a closed curve path. An image of a group of sub-pixels 101 rotates about a rotational scan pattern 80 to create a high resolution pixel field 21.

For example, the inter-view barrier 260 can be periodic or aperiodic. The size, aspect ratio, and number and shape of the translucent windows can vary to suit factors such as number of views.

The optical barrier 152 and microlens array 153 can be reconfigured to suit illumination engines of different sizes. The windows of the optical barrier can be aligned to a square grid, or an offset square grid (i.e. "Knight's move" pattern), or rotated on a diagonal grid.

Further, the teachings herein are useful for embodiments of three-dimensional (3D) displays. Consider that one particularly desirable application for a large pixel count image is for use in 3D display applications. One disadvantage of these systems is that they sacrifice the pixel count of the display in order to achieve the desired 3D effect. The reason for this is that a group of pixels is used to produce 3D ray information (views) for a grid of positions with coarser sampling than the pixel grid. For instance, using a UXGA (1600×1200 pixel) LCD panel, a display might be created which allows nine (9) views and $1600/\sqrt{9} \times 1200/\sqrt{9} = 533 \times 400$ pixels. Such a display would have too few views and too small resolution to be effective. The disclosed 3D display provides sufficient resolution for a 3D effect without reducing the pixel count below a desirable level. Thus, the display can present 25 views with 1024×768 pixels. This pixel count is suitable for most desktop applications, and the number of views is enough to provide convincing 3D imagery.

Accordingly, the 3D display generally includes a spatial demultiplexing element that has at least one of a lenticular lens array, an upstream glass plate, a downstream glass plate, a parallax barrier, a holographic optical element and a fly's eye lens array for generating the 3D enhanced image.

A 3D display can be constructed by optically associating a high-quality lenticular lens sheet as taught in U.S. Pat. No. 6,490,094 to the output image plane. A particularly large number of horizontal-parallax view directions, such as 24, can be attained by introducing a slight clockwise or counterclockwise angle of the lenticular lens axis to the output image columns.

The aspect ratio of the image source can be maintained by increasing the pixel count of the rows and columns of the tiled image both by a factor of $\sqrt{K}$ (producing a $(\sqrt{K} \cdot N) \times (\sqrt{K} \cdot M)$ pixel image. If the tiled image is then the same size as the image source, it will have a higher resolution than the image source by a factor of $\sqrt{K}$.

A range of colors or levels of grayscale can be created using a number of techniques. For example, traditional pulse-width modulation techniques can be used based on the "dwell time" of the optical filter/scanner on each pixel.

In another example, the source images can be modulated by a logarithmic or exponential illumination source or attenuation filter. That is, each projection component (DMD) can be associated with a color wheel or grayscale wheel of various transmittances. Or, the illumination can be rapidly controlled to provide additive components of an output pixel's resultant brightness. Xenon lamps can be controlled at sufficient rates for this effect. For sufficiently fast output image creation sequences, imagery with a variety of grayscale or color-levels can be produced.

In support of the teachings herein, various computer components including software may be had to provide for operation and analyses of the apparatus and methods disclosed herein. Accordingly, it is considered that these teachings may be implemented in conjunction with a set of computer executable instructions stored on a computer readable medium, comprising ROM, RAM, CD ROM, flash or any other computer readable medium, now known or unknown, that when executed cause a computer to implement the method of the present invention. These instructions may provide for equipment operation, control, data collection and analysis and other functions deemed relevant by a user.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system, comprising:
    a device configured to output an image sequence comprising a plurality of source images, wherein the plurality of source images comprise a plurality of pixels that represent image information; and
    a projector configured to present, within a period of integration, the plurality of source images to an optical filter, wherein the optical filter is configured to mask the plurality of source images to generate a plurality of filtered images and to provide a corresponding plurality of filtered pixels as sub-pixels of an updated image, and wherein the plurality of filtered pixels include a portion of the image information represented by the plurality of pixels.

2. The system of claim 1, wherein the projector comprises at least one of a digital light projector, a lamp, a color-wheel or a spatial light modulator.

3. The system of claim 1, wherein the period comprises about fifty milliseconds.

4. The system of claim 1, wherein the optical filter comprises at least one of an aperture array or a liquid crystal device.

5. The system of claim 1, further comprising:
    a scanner.

6. The system of claim 5, wherein the scanner comprises at least one of a piezo-electric scanner, a translational scanner or a rotational scanner.

7. The system of claim 5, wherein the scanner is configured to provide a scan pattern comprising one degree of freedom.

8. The system of claim 5, wherein the scanner is configured to provide a scan pattern comprising at least two degrees of freedom.

9. The system of claim 1, further comprising a two-dimensional illumination source configured to output at least one of the plurality of source images.

10. The system of claim 1, wherein the optical filter comprises a series of light-blocking regions configured as apertures.

11. The system of claim 1, further comprising optics comprising at least one of a lenticular lens array, an upstream glass plate, a downstream glass plate, a parallax barrier, a holographic optical element or a fly eye lens array to provide a spatial demultiplexing element adapted to vary at least one of a direction or an amplitude of the sub-pixels.

12. The system of claim 1, wherein the updated image comprises a three-dimensional updated image.

13. The system of claim 1, wherein the projector is configured to project at least 1,000 frames per second.

14. The system of claim 1, wherein the plurality of source images comprise m pixels in a first direction and n pixels in a second direction and the updated image comprises m times n times K total pixels, wherein K is a number representative of how many source images are in the plurality of source images.

15. A method, comprising:
    outputting an image sequence comprising a plurality of source images that comprise a plurality of pixels representing image information;
    projecting the plurality of source images of the image sequence within a period of integration;
    masking the plurality of source images of the image sequence to generate a plurality of filtered images with a plurality of filtered pixels, wherein the plurality of filtered pixels include a portion of the image information represented by the plurality of pixels; and
    generating an updated image from the plurality of filtered pixels of the plurality of filtered images, wherein the plurality of filtered pixels are sub-pixels of the updated image.

16. The method of claim 15, wherein the generating comprises offsetting the sub-pixels within respective portions of pixels of the updated image.

17. The method of claim 15, wherein the generating comprises scanning in a single direction.

18. The method of claim 15, wherein the generating comprises scanning in at least two directions.

19. The method of claim 15, wherein the generating comprises scanning with at least one of a rotational, translational, electrical, mechanical or electro-mechanical technique.

20. The method of claim 15, wherein the generating comprises scanning according to at least one of a random pattern, a boustrophedonic pattern or a Lissajous pattern.

21. The method of claim 15, further comprising mapping locations for the sub-pixels.

22. The method of claim 15, further comprising generating one of a two dimensional or a three-dimensional updated image.

23. A computer-readable storage device comprising computer-executable instructions that, in response to execution, cause a computing system to perform operations, comprising:
    outputting an image sequence comprising a plurality of source images that comprise a plurality of pixels;
    projecting a first source image of the plurality of source images including projecting a plurality of first pixels that represent first image information;
    masking the first source image into to generate a first filtered image with a plurality of first filtered sub-pixels on a first location of a surface for pixels of an updated image, wherein the plurality of first filtered sub-pixels include a portion of the first image information represented by the plurality of first pixels;

projecting a next source image of the plurality of source images including projecting a plurality of next pixels that represent next image information; and masking the next source image to generate a next filtered image with a plurality of next filtered sub-pixels in a next location for the pixels of the updated image at least until the first and next filtered images have been projected on the surface of the updated image within a period of visual integration, wherein the plurality of next filtered sub-pixels include a portion of the next image information represented by the plurality of next pixels.

24. The computer-readable storage device of claim 23, wherein the updated image comprises one of a two-dimensional image or a three-dimensional image.

25. The computer-readable storage device of claim 23, the operations further comprising determining an offset for the first location and the next location.

26. A system, comprising:
means for receiving an image sequence comprising a plurality of source images that comprise a plurality of pixels, wherein the plurality of pixels represent image information;
means for presenting, within a period of integration, the plurality of source images to filtering means for masking the plurality of source images to generate a plurality of filtered images with a corresponding plurality of sub-pixels, wherein the plurality of sub-pixels include a portion of the image information represented by the plurality of pixels; and
means for generating an updated image using the plurality of sub-pixels.

27. A method, comprising:
selecting components to receive an image sequence comprising a plurality of source images that comprise a plurality of pixels that represent image information;
masking the plurality of source images into resulting in a plurality of filtered images including implementing a plurality of windows that provide a plurality of filtered pixels of the plurality of filtered images as sub-pixels of an updated image, wherein the plurality of filtered pixels include a portion of the image information represented by the plurality of pixels; and
assembling the components.

28. The method of claim 27, wherein the selecting comprises selecting the components to increase a number of source images within the plurality of source images.

29. The method of claim 27, wherein the selecting comprises selecting an optical filter that provides brightness in the updated image.

30. A system, comprising:
a device configured to output an image sequence comprising a plurality of source images that comprise a plurality of pixels, wherein the plurality of pixels represent image information; and
a projector configured to present, within a period of integration, the plurality of source images to an optical filter and a spatial demultiplexing element, wherein the optical filter is configured to mask the plurality of source images to generate a plurality of filtered images and to provide a corresponding plurality of filtered pixels as sub-pixels of an updated image, and wherein the plurality of filtered pixels include a portion of the image information represented by the plurality of pixels.

31. The system as in claim 30, wherein the spatial demultiplexing element comprises a lenticular lens array.

32. The system as in claim 30, wherein the spatial demultiplexing element comprises at least one of an upstream glass plate, a downstream glass plate, a parallax barrier, a holographic optical element or a fly eye lens array.

33. The system as in claim 30, wherein the spatial demultiplexing element is adapted to vary at least one of a direction or an amplitude of the sub-pixels.

34. An apparatus comprising:
a device configured to output an image sequence comprising a plurality of source images that comprise a plurality of pixels, wherein the plurality of pixels represent image information; and
a projector configured to present, within a period of integration, the plurality of source images to an aperture array, wherein the aperture array is configured to mask the plurality of source images to generate a plurality of filtered images and to provide a plurality of filtered pixels as sub-pixels of pixels in an updated image, and wherein the plurality of filtered pixels include a portion of the image information represented by the plurality of pixels.

* * * * *

UNITED STATES PATENT AND TRADEMARK OFFICE
CERTIFICATE OF CORRECTION

PATENT NO. : 8,356,905 B2
APPLICATION NO. : 11/614548
DATED : January 22, 2013
INVENTOR(S) : Cossairt et al.

It is certified that error appears in the above-identified patent and that said Letters Patent is hereby corrected as shown below:

In the Specification

In Column 4, Line 3, delete "an" and insert -- a --, therefor.

In Column 4, Line 11, delete "illustrate" and insert -- illustrates --, therefor.

In Column 6, Line 36, delete "micro-electromechanical (MEMS)" and insert -- micro-electromechanical system (MEMS) --, therefor.

In Column 7, Line 51, delete "enhanced image 60" and insert -- enhanced image 21 --, therefor.

In Column 8, Line 47, delete "aperature 59" and insert -- aperture 59 --, therefor.

In Column 13, Line 12, delete "Piezosysystem" and insert -- Piezosystem --, therefor.

In Column 13, Line 37, delete "deign" and insert -- design --, therefor.

In Column 14, Line 4, delete "101*a[*1:6].*" and insert -- 101*a*[1:6]. --, therefor.

In the Claims

In Column 18, Line 62, in Claim 23, delete "into to" and insert -- to --, therefor.

In Column 19, Line 37, in Claim 27, delete "into resulting" and insert -- resulting --, therefor.

Signed and Sealed this
Seventeenth Day of June, 2014

Michelle K. Lee
*Deputy Director of the United States Patent and Trademark Office*